(12) United States Patent
Koo et al.

(10) Patent No.: US 7,443,382 B2
(45) Date of Patent: Oct. 28, 2008

(54) SCROLL WHEEL CARRIAGE

(75) Inventors: James Y. Koo, Renton, WA (US); David D Bohn, Fort Collins, CO (US)

(73) Assignee: Microsoft Corporation, Redmond, WA (US)

(*) Notice: Subject to any disclaimer, the term of this patent is extended or adjusted under 35 U.S.C. 154(b) by 700 days.

(21) Appl. No.: 10/927,233

(22) Filed: Aug. 27, 2004

(65) Prior Publication Data
US 2006/0044272 A1    Mar. 2, 2006

(51) Int. Cl.
G09G 5/08    (2006.01)
(52) U.S. Cl. .................................. 345/163; 345/184
(58) Field of Classification Search .......... 345/156–184
See application file for complete search history.

(56) References Cited

U.S. PATENT DOCUMENTS

| | | |
|---|---|---|
| 4,712,101 A | 12/1987 | Culver |
| 4,720,703 A | 1/1988 | Schnarel, Jr. et al. |
| 5,063,289 A | 11/1991 | Jasinski et al. |
| 5,235,868 A | 8/1993 | Culver |
| 5,313,229 A | 5/1994 | Gilligan et al. |
| 5,404,152 A | 4/1995 | Nagai |
| 5,446,481 A | 8/1995 | Gillick et al. |
| 5,477,508 A | 12/1995 | Will |
| 5,510,811 A | 4/1996 | Tobey et al. |
| 5,517,257 A | 5/1996 | Dunn et al. |
| 5,521,617 A | 5/1996 | Imai et al. |
| 5,530,455 A | 6/1996 | Gillick |
| 5,680,312 A | 10/1997 | Oshizawa et al. |
| 5,771,038 A | 6/1998 | Wang |
| 5,774,075 A | 6/1998 | Palalau et al. |
| 5,808,568 A | 9/1998 | Wu |
| 5,910,798 A | 6/1999 | Kim |
| 5,912,661 A | 6/1999 | Siddiqui |
| 5,952,997 A | 9/1999 | Hu |

(Continued)

FOREIGN PATENT DOCUMENTS

CN    1267016 A    9/2000

(Continued)

OTHER PUBLICATIONS

U.S. Appl. No. 10/382,652, filed Mar. 7, 2003.

(Continued)

Primary Examiner—Jimmy H Nguyen
(74) Attorney, Agent, or Firm—Banner & Witcoff, Ltd.

(57) ABSTRACT

An axle of a scroll wheel for a mouse or other type of computer input device is held in a first part of a carriage. The first carriage part is joined to a second part of the carriage by a flexure. When a force is applied to one side of the scroll wheel, the first part of the carriage moves in one direction relative to the second part so as to engage a first switch. When a force is applied to the other side of the scroll wheel, the first part of the carriage moves in the opposite direction to engage a second switch. The carriage is connected to a base. When sufficient force is applied to the scroll wheel in the proper direction, at least a portion of the carriage moves and engages a third switch. The carriage includes a tang or other flexible member to bias the carriage against pivotal movement.

28 Claims, 24 Drawing Sheets

U.S. PATENT DOCUMENTS

| | | | |
|---|---|---|---|
| 5,956,018 A | 9/1999 | Pejic et al. |
| 5,959,614 A | 9/1999 | Ho |
| 5,963,197 A | 10/1999 | Bacon et al. |
| 6,016,110 A | 1/2000 | Takinami |
| 6,075,518 A | 6/2000 | Pruchniak |
| 6,075,575 A | 6/2000 | Schein et al. |
| 6,097,371 A | 8/2000 | Siddiqui et al. |
| 6,097,372 A | 8/2000 | Suzuki |
| 6,100,874 A | 8/2000 | Schena et al. |
| D431,037 S | 9/2000 | Varga et al. |
| 6,128,006 A | 10/2000 | Rosenberg et al. |
| 6,132,118 A | 10/2000 | Grezeszak |
| 6,188,393 B1 | 2/2001 | Shu |
| 6,198,473 B1 | 3/2001 | Armstrong |
| 6,204,838 B1 | 3/2001 | Wang |
| 6,281,881 B1 | 8/2001 | Siddiqui et al. |
| 6,300,939 B1 | 10/2001 | Decker et al. |
| 6,323,843 B2 | 11/2001 | Giles et al. |
| 6,323,844 B1 | 11/2001 | Yeh et al. |
| 6,325,720 B1 | 12/2001 | Tsukahara et al. |
| 6,337,679 B1 | 1/2002 | Chou |
| 6,340,800 B1 | 1/2002 | Zhai et al. |
| 6,340,966 B1 | 1/2002 | Wang et al. |
| 6,348,912 B1 | 2/2002 | Smith |
| 6,353,429 B1 | 3/2002 | Long |
| 6,359,611 B2 | 3/2002 | Chan |
| 6,373,404 B1 | 4/2002 | Chou |
| 6,380,927 B1 | 4/2002 | Ostrum et al. |
| 6,424,355 B2 | 7/2002 | Watanabe et al. |
| 6,519,003 B1 | 2/2003 | Swayze |
| 6,522,321 B1 | 2/2003 | Chen et al. |
| 6,534,730 B2 | 3/2003 | Ohmoto et al. |
| 6,555,768 B2 | 4/2003 | Deruginski et al. |
| 6,563,490 B1 | 5/2003 | Wang et al. |
| 6,570,108 B2 | 5/2003 | Lin |
| 6,580,420 B1 | 6/2003 | Wang |
| 6,608,616 B2 | 8/2003 | Lin |
| 6,697,050 B1 | 2/2004 | Shinohe et al. |
| 6,717,572 B1 | 4/2004 | Chou et al. |
| 6,809,275 B1 | 10/2004 | Cheng et al. |
| 6,809,727 B2 | 10/2004 | Piot et al. |
| 6,921,054 B2 | 7/2005 | Doan |
| 6,956,558 B1 | 10/2005 | Rosenberg et al. |
| 6,987,505 B1 | 1/2006 | Koo |
| 7,042,441 B2 | 5/2006 | Adams et al. |
| 7,075,516 B2 | 7/2006 | Bohn |
| 7,084,854 B1 | 8/2006 | Moore et al. |
| 7,119,791 B2 | 10/2006 | Iwasaki |
| 2001/0011995 A1 | 8/2001 | Hinckley et al. |
| 2001/0050673 A1 | 12/2001 | Davenport |
| 2002/0024502 A1 | 2/2002 | Iwasaki |
| 2002/0030664 A1 | 3/2002 | Schena et al. |
| 2002/0054023 A1 | 5/2002 | Adan et al. |
| 2002/0149566 A1 | 10/2002 | Sarkissian |
| 2002/0158844 A1 | 10/2002 | McLoone et al. |
| 2002/0175893 A1 | 11/2002 | Ore-Yang |
| 2003/0025673 A1 | 2/2003 | Ledbetter et al. |
| 2003/0076303 A1 | 4/2003 | Huppi |
| 2003/0095096 A1 | 5/2003 | Robbin et al. |
| 2003/0107547 A1 | 6/2003 | Kehlstadt et al. |
| 2003/0151594 A1 | 8/2003 | Tsai |
| 2004/0001042 A1 | 1/2004 | Lindhout et al. |
| 2004/0051392 A1 | 3/2004 | Badarneh |
| 2004/0150623 A1 | 8/2004 | Ledbetter et al. |
| 2004/0207603 A1* | 10/2004 | Lin ............................. 345/164 |
| 2005/0068299 A1 | 3/2005 | Ore-Yang |
| 2005/0104854 A1 | 5/2005 | Su et al. |
| 2005/0231463 A1* | 10/2005 | Yang ........................... 345/156 |
| 2005/0259077 A1 | 11/2005 | Adams et al. |
| 2005/0264520 A1 | 12/2005 | Wang |
| 2006/0022944 A1* | 2/2006 | Pai ............................. 345/163 |

FOREIGN PATENT DOCUMENTS

| | | |
|---|---|---|
| CN | 2491885 Y | 5/2002 |
| EP | 1258019 B9 | 11/2002 |
| JP | 07-092939 | 4/1995 |
| JP | 2000-200147 | 7/2000 |
| TW | 347128 | 12/1998 |
| TW | 356265 | 4/1999 |

OTHER PUBLICATIONS

Web page reviewing "Kensington TurboRing Trackball"; http://www.avault.com/hardware/print_review.asp?review=turboring; publication date unknown, but prior to Aug. 26, 2003.

Web page reviewing "TurboRing"; http://www.macworld.com/2000/10/reviews/turboring.html; publication date unknown, but prior to Aug. 26, 2003.

Web page from "Van's Hardware"; http://www.vanshardware.com/reviews/2001/october/011002_TurboRing/011002_TurboRing.htm; published Oct. 2, 2001.

Web page reviewing "TurboRing"; http://www.keyalt.com/pointdevices/turboring.htm; publication date unknown, but prior to Aug. 26, 2003.

Web page for "Micro TRACTM"; http://www.microspeed.com/products/pd600s.html; publication date unknown, but prior to Aug. 26, 2003.

Web page for "Kid TRAC" model PD-280S; http://www.microspeed.com/products/kidtrac.html; publication date unknown, but prior to Aug. 26, 2003.

Web page for Kid TRAC User's Manual; http://www.microspeed.com/pages/support/manuals/kidtracm.html; publication date unknown, but prior to Aug. 26, 2003.

Web page for "Ateck" A4 RFW-33 Radio Wireless PS/2 Mouse; http://www.shop.store.yahoo.com/4itech/a4rfradwirps.html; publication date unknown, but prior to Aug. 26, 2003.

Web page for "Sakar Yahoo! 4D Internet Scroll Mouse" and "Sakar Optical Mouse w/Email alert Metallic Silver (USB)"; http://www.slarp.com/products/Input_Devices/Mice_and_Trackballs/; publication date unknown, but prior to Aug. 26, 2003.

Web page for "ICONCEPTS 70152"; http://www.panwebi.com/products/computer/mouse/70152.htm; publication date unknown, but prior to Aug. 26, 2003.

Web page for "Yahoo 8D Internet Mouse"; http://www.panwebi.com/products/computer/mouse/8dinternetmouse.htm; publication date unknown, but prior to Aug. 26, 2003.

Photo A: photograph of scroll wheel from LOGITECH cordless optical mouse, P/N 851497-0000; date of first availability and/or disclosure prior to Aug. 26, 2003.

Photo B: (second) photograph of scroll wheel from LOGITECH cordless optical mouse, P/N 851497-0000; date of first availability and/or disclosure prior to Aug. 26, 2003.

Photo C: photograph of scroll wheel from mouse manufactured by A4tech Co., Ltd., Taipei, Taiwan; date of first availability and/or disclosure prior to Aug. 26, 2003.

Photo D: (second) photograph of scroll wheel from mouse manufactured by A4tech Co., Ltd., Taipei, Taiwan; date of first availability and/or disclosure prior to Aug. 26, 2003.

Photo E: photograph of scroll wheel from mouse manufactured by KYE Systems, Taipei, Taiwan; date of first availability and/or disclosure prior to Aug. 26, 2003.

Photo F: photograph of scroll wheel from RAZER "Boomslang" mouse, available from Karnä LLC, Taiwan; date of first availability and/or disclosure prior to Aug. 26, 2003.

Bourns PTA Series—Low Profile Slide Potentiometer, 2 sheets, date unknown, but prior to Aug. 26, 2003.

Logitech Products—Mice, http://www.logitech.com/index.cfm/products/productlist/US/EN,CRID=19, pp. 1-12, printed Aug. 24, 2004.

Logitech Product—*Cordless Click!™, Cordless Click!™ Plus to Include New Mini-Receivers and Three-Dimensional Scrolling*, http://www.logitech.be/index.cfm/about/pressroom/information/BE/FR,crid=2039,contentID=8255, pp. 1-2, printed Jul. 23, 2004.

Tom's Hardware Guide Peripherals & Consumer Electronics, *Logitech New Mouse Range Goes Back to the Future, Hi-tech or Lifestyle*, http://www.tomshardware.com/consumer/20040709/index.html, pp. 1-4, printed Jul. 23, 2004.

Tom's Hardware Guide Peripherals & Consumer Electronics, *Logitech New Mouse Range Goes Back to the Future, The Mouse: A Well-deserved Success Story*, http://www.tomshardware.com/consumer/20040709/logitech-01.html, pp. 1-6, printed Jul. 23, 2004.

Tom's Hardware Guide Peripherals & Consumer Electronics, *Logitech New Mouse Range Goes Back to the Future, The Mouse: A Well-deserved Success Story, Continued*, http://www.tomshardware.com/consumer/20040709/logitech-02.html, pp. 1-5, printed Jul. 23, 2004.

Tom's Hardware Guide Peripherals & Consumer Electronics, *Logitech New Mouse Range Goes Back to the Future, The Secrets of the Powers That Be*, http://www.tomshardware.com/consumer/20040709/logitech-03.html, pp. 1-8, printed Jul. 23, 2004.

Tom's Hardware Guide Peripherals & Consumer Electronics, *Logitech New Mouse Range Goes Back to the Future, But How Does It Work?*, http://www.tomshardware.com/consumer/20040709/logitech-04.html, pp. 1-5, printed Jul. 23, 2004.

Tom's Hardware Guide Peripherals & Consumer Electronics, *Logitech New Mouse Range Goes Back to the Future, A Tiny Camera, Continued*, http://www.tomshardware.com/consumer/20040709/logitech-05.html, pp. 1-4, printed Jul. 23, 2004.

Tom's Hardware Guide Peripherals & Consumer Electronics, *Logitech New Mouse Range Goes Back to the Future, Calculation Speed*, http://www.tomshardware.com/consumer/20040709/logitech-06.html, pp. 1-4, printed Jul. 23, 2004.

Tom's Hardware Guide Peripherals & Consumer Electronics, *Logitech New Mouse Range Goes Back to the Future, The Equation Isn't Mathematical*, http://www.tomshardware.com/consumer/20040709/logitech-07.html, pp. 1-5, printed Jul. 23, 2004.

Tom's Hardware Guide Peripherals & Consumer Electronics, *Logitech New Mouse Range Goes Back to the Future, MX 510: A Different Look*, http://www.tomshardware.com/consumer/20040709/logitech-08.html, pp. 1-5, printed Jul. 23, 2004.

Tom's Hardware Guide Peripherals & Consumer Electronics, *Logitech New Mouse Range Goes Back to the Future, But Is It Better?*, http://www.tomshardware.com/consumer/20040709/logitech-09.html, pp. 1-4, printed Jul. 23, 2004.

Tom's Hardware Guide Peripherals & Consumer Electronics, *Logitech New Mouse Range Goes Back to the Future, Something New in the Click Range*, http://www.tomshardware.com/consumer/20040709/logitech-10.html, pp. 1-6, printed Jul. 23, 2004.

Tom's Hardware Guide Peripherals & Consumer Electronics, *Logitech New Mouse Range Goes Back to the Future, Really Cordless*, http://www.tomshardware.com/consumer/20040709/logitech-11.html, pp. 1-5, printed Jul. 23, 2004.

Tom's Hardware Guide Peripherals & Consumer Electronics, *Logitech New Mouse Range Goes Back to the Future, More For More Class*, http://www.tomshardware.com/consumer/20040709/logitech-12.html, pp. 1-6, printed Jul. 23, 2004.

Picture 1, Slide presented during Mar. 19, 2004 press conference by Logitech at CeBIT trade show, Hannover, Germany.

Pictures of a disassembled Logitech Product (Mouse) purchased Jul. 2004 in Europe, 12 pictures (labeled pictures 2-13).

<http://www.mside.net/microscrollii.html>, MSIDE.net, showing Micro Scroll II mouse from Micro, 2 sheets, Dec. 2000.

<http://www.contourdesign.com/rollerbar.htm>, Contour Design-RollerBar Mousing Station-Optical Technology, 2 sheets, Jan. 2001 and 1 sheet press release dated Nov. 29, 2000.

<http://www.mousetrapper.dk>, Mouse Trapper product description, 12 color sheets including original Danish language and English translation as performed by Translation Experts Ltd. Service, date of product release unknown but prior to filing date of application.

Three screen shots (date of screen shots unknown); Taiwan Microsoft IntelliPoint 5.3; IntelliPoint 5.5 Mouse Software for Windows—32B.

* cited by examiner

SCROLL WHEEL CARRIAGE

FIELD OF THE INVENTION

This invention relates to scroll wheels on mice, trackballs, keyboards and other user input devices. In particular, this invention relates to a scroll wheel assembly permitting movement of a scroll wheel rotational axis about one or more additional axes.

BACKGROUND OF THE INVENTION

In many computers, a pointing device such as a mouse or a trackball is used to provide input (e.g., cursor control, screen scrolling, etc.). A typical computer mouse 1 is shown in FIG. 1. Mouse 1 has a case 2 having a bottom case 3 and an upper case 4. As a user slides mouse 1 across a planar (or substantially planar) surface, motion detectors and encoders within case 2 may convert the two-dimensional movement of the mouse across the surface into horizontal and vertical motion of a cursor, pointer, or other object on a computer screen. Mouse 1 has two buttons 5 and 6 which a user can "click" or "double click" to select something on a computer screen. Other mice may have fewer or additional buttons, or other features. Mouse 1 may be connected to a computer or other device by a cord 7 through which mouse 1 may receive power and communicate with a computer (or other device). Alternatively, mouse 1 could be battery powered and communicate via a wireless connection. Mouse 1 also has a scroll wheel 8. Scroll wheel 8 is located such that the mouse user can comfortably turn the scroll wheel with a finger. The mouse and/or computer may be configured such that turning the wheel causes the screen image to scroll upwards or downwards. Keyboards and other input devices may also include a scroll wheel or other control performing a similar function.

Recently, computer mice and keyboards including a horizontal scrolling control have been developed. For example, displayable portions of spreadsheets, large documents and various other images are often wider than the display screen. In order to view an entire image, the user must pan the display to one side. In the past, this has typically required selecting a horizontal scroll bar (or other graphical user interface on the display screen) with a mouse or other pointing device and then moving the mouse or other pointing device. Now, a horizontal scrolling control permits a user to pan a screen image by manipulating a wheel, a button or other type of control. Examples of horizontal scrolling controls are described in commonly-owned U.S. patent application Ser. No. 10/184,000 (titled "Input Device Including A Wheel Assembly for Scrolling An Image In Multiple Directions" and filed Jun. 28, 2002), Ser. No. 10/183,993 (titled "Input Device Including A Scroll Wheel Assembly for Manipulating An Image In Multiple Directions" and filed Jun. 28, 2002), Ser. No. 10/183,994 (titled "Scrolling Apparatus Providing Multi-Directional Movement of An Image" and filed Jun. 28, 2002) and Ser. No. 10/382,652 (titled "Scroll Wheel Assembly for Scrolling An Image In Multiple Directions" and filed Mar. 7, 2003), all of which are incorporated by reference herein.

One type of horizontal scrolling control is a scroll wheel which is also movable from side to side. When such a scroll wheel is moved in this fashion, the image displayed on a computer screen may be horizontally scrolled. Examples of such horizontal scroll wheels are described in the aforementioned Ser. Nos. 10/184,000 and 10/382,652 applications. Such a scroll wheel is a significant advancement. However, existing designs for this type of control typically include a number of parts. These parts must be separately manufactured and then assembled to form a functional device. Because of this, inclusion of a horizontal scroll feature in a mouse or other input device usually results in higher manufacturing costs. Significant cost advantages can be gained if the number of separate parts in a horizontal scroll mechanism can be reduced.

SUMMARY OF THE INVENTION

In at least some embodiments of the invention, a scroll wheel is held within a carriage. The carriage allows the scroll wheel to rotate about a rotational axis of the scroll wheel. The carriage further includes a flexible component which allows a portion of the carriage holding the scroll wheel to move relative to another portion of the carriage. When a force is applied to one side of the scroll wheel, the portion of the carriage holding the scroll wheel moves in one direction to engage a first switch. When a force is applied to the other side of the scroll wheel, the portion of the carriage holding the scroll wheel moves in the opposite direction to engage a second switch. In at least some embodiments, at least part of the carriage is further configured to move, relative to a base, about an axis parallel to the wheel rotational axis. When sufficient force is applied to the scroll wheel in the proper direction, the carriage moves about that parallel axis and engages a third switch. In certain embodiments, the carriage includes a tang or other flexible member to bias the carriage against movement.

Other features and advantages of the it forth below in the detailed description or will be apparent to persons skilled in the art in light of that description.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
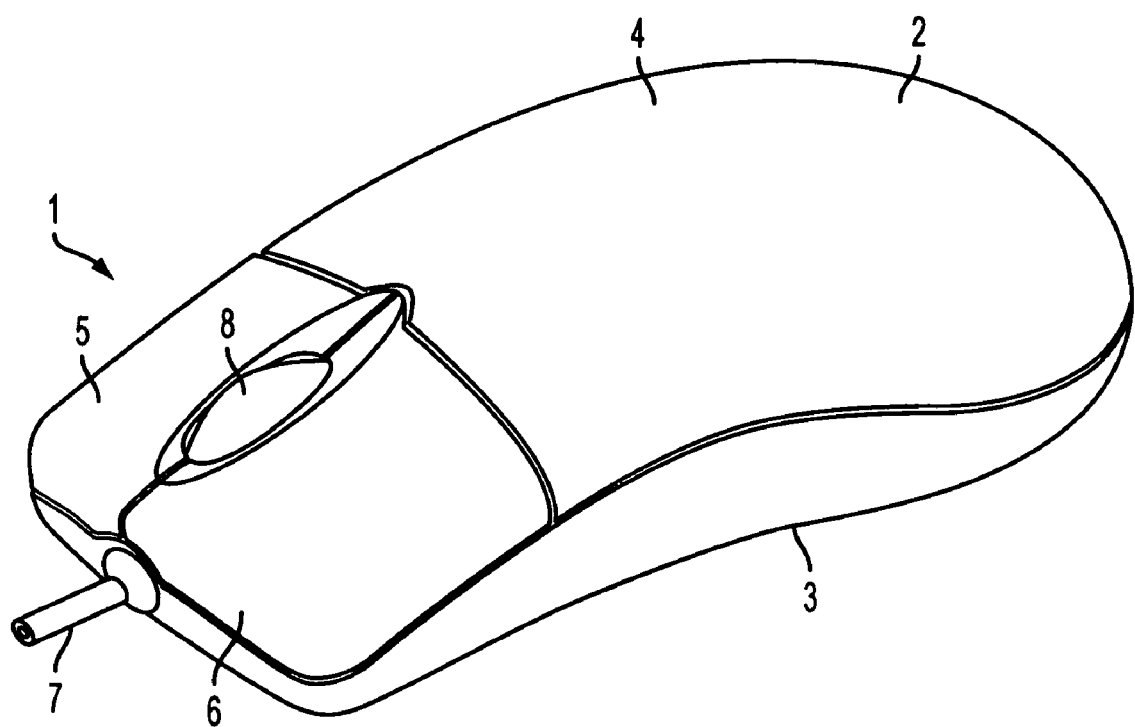
FIG. 1 is perspective view of a conventional computer mouse having a scroll wheel.
Figure 2:
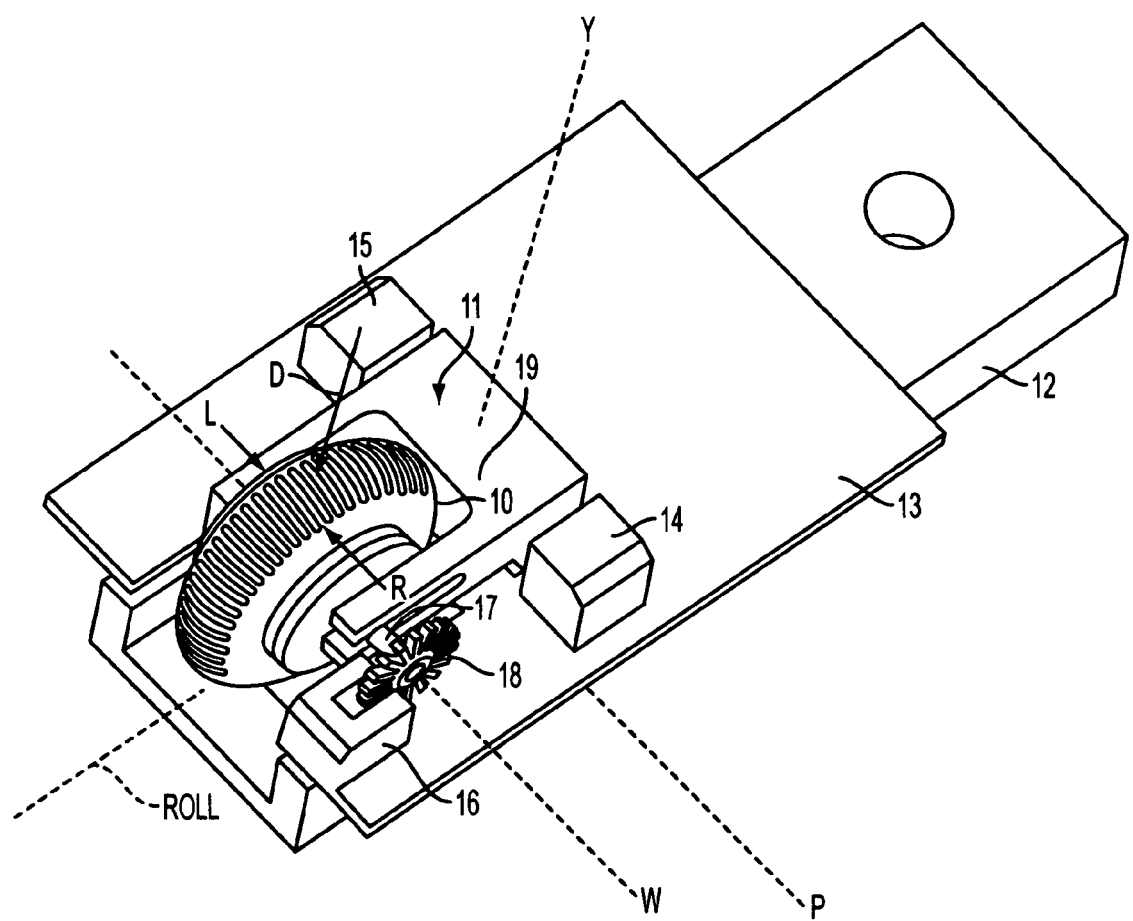
FIG. 2 is a perspective view of a scroll wheel assembly according to at least some embodiments of the invention.

Shown in FIG. 2 is an improved scroll wheel assembly according to at least some embodiments of the invention and configured for use in a computer mouse. The outer housing (which could be similar to case 2 in FIG. 1), buttons and other components of the mouse have been omitted for purposes of illustration. Scroll wheel 10 is rotatably held within a carriage 11. Carriage 11 is coupled to base 12 via a pivotal connection not shown in FIG. 2, but which is described in more detail below. As used herein, "coupled" includes two components that are attached via one or more intermediate components. Base 12, which serves as a holder of carriage 11, is coupled to and/or integral with the lower portion of the mouse housing. In at least some embodiments, base 12 is a bracket molded into the inner surface of the mouse housing. Also attached to base 12 is a printed circuit board (PCB) 13. PCB 13 electrically interconnects various mouse components, and also provides an internal structure to which other components may be attached. Those components include left horizontal switch 14, right horizontal switch 15, and vertical scrolling optical pair 16. Additional components attached to PCB 13, not shown in FIG. 2, include electronics for detecting and encoding mouse motion, a light source (such as a light emitting diode), and electronics for transmitting data to a computer.

Scroll wheel 10 rotates about an axle 17 having a rotational axis W passing through the wheel center. In at least some embodiments, axle 17 is integral to scroll wheel 10. Affixed to one end of axle 17 is a fan 18. Fan 18 has alternating spaces and spokes. As scroll wheel 10 rotates about axis W, fan 18 rotates within optical pair 16. Optical pair 16 includes a light source (not shown) and receptor (also not shown) on opposing sides of fan 18. As fan 18 turns within optical pair 16, the rotation of fan 18 is encoded. This encoded rotation can be transmitted to a computer (not shown) for conversion into vertical screen scrolling. Optical pairs are known in the art and thus not further described herein.

In at least some embodiments, carriage 11 (and thus rotational axis W and scroll wheel 10) rotates about pitch axis P. Applied force in the direction of arrow D moves scroll wheel 10 downward about pitch axis P. A tang 29 (not shown in FIG. 2 but described below and shown in other figures) biases carriage 11 upward about axis P. When scroll wheel 10 is pressed in direction D with sufficient force, contact is made with a center switch 36 (not shown in FIG. 2, but described in more detail below and shown in other figures), thereby providing an additional "button" input for the mouse.

As explained in more detail below, an upper bracket 19 of carriage 11 (and thus, scroll wheel 10 and axis W) moves generally about a roll axis (labeled "Roll"). The Roll axis is partially shown in FIG. 2, and is shown in more clearly in FIGS. 4 and 6. When scroll wheel 10 is pressed in direction L with sufficient force, upper bracket 19 moves about the Roll axis toward, and makes contact with, left horizontal scroll switch 14. In response to actuation of switch 14, a signal is sent by mouse electronics (not shown in FIG. 2) to a computer. The signal may be converted into a command causing horizontal scrolling of the display to the left. Applied force in the direction of arrow R moves upper bracket 19 in the opposite direction about the Roll axis. When scroll wheel 10 is pressed in direction R with sufficient force, upper bracket 19 rolls towards, and makes contact with, right horizontal scroll switch 15. In response to actuation of switch 15, a signal is sent by mouse electronics to a computer. The signal may be converted into a command causing horizontal scrolling of the display to the right. Switches 14, 15 and 36 can be any of various types of switches, including but not limited to self-biased metallic beam switches or metallic disc switches. As is known in the art, these types of switches are typically mechanically biased to one state (e.g., one of "off" or "on"), and assume another state (e.g., the other of "off" or "on") when an external force is exerted on the switch.

Figure 3:
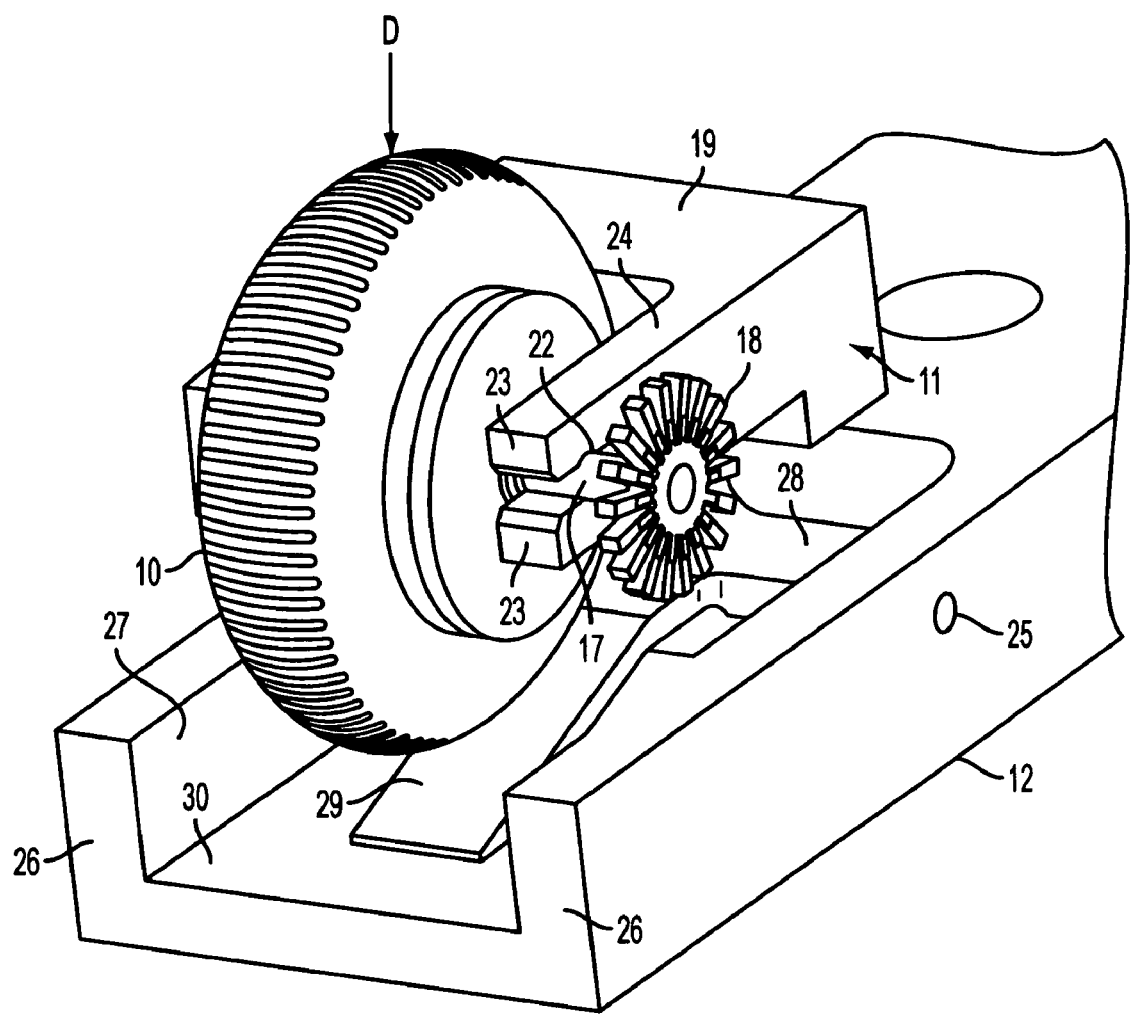
FIGS. 3-5 are additional perspective views of the scroll wheel assembly of FIG. 2.
Figure 25:
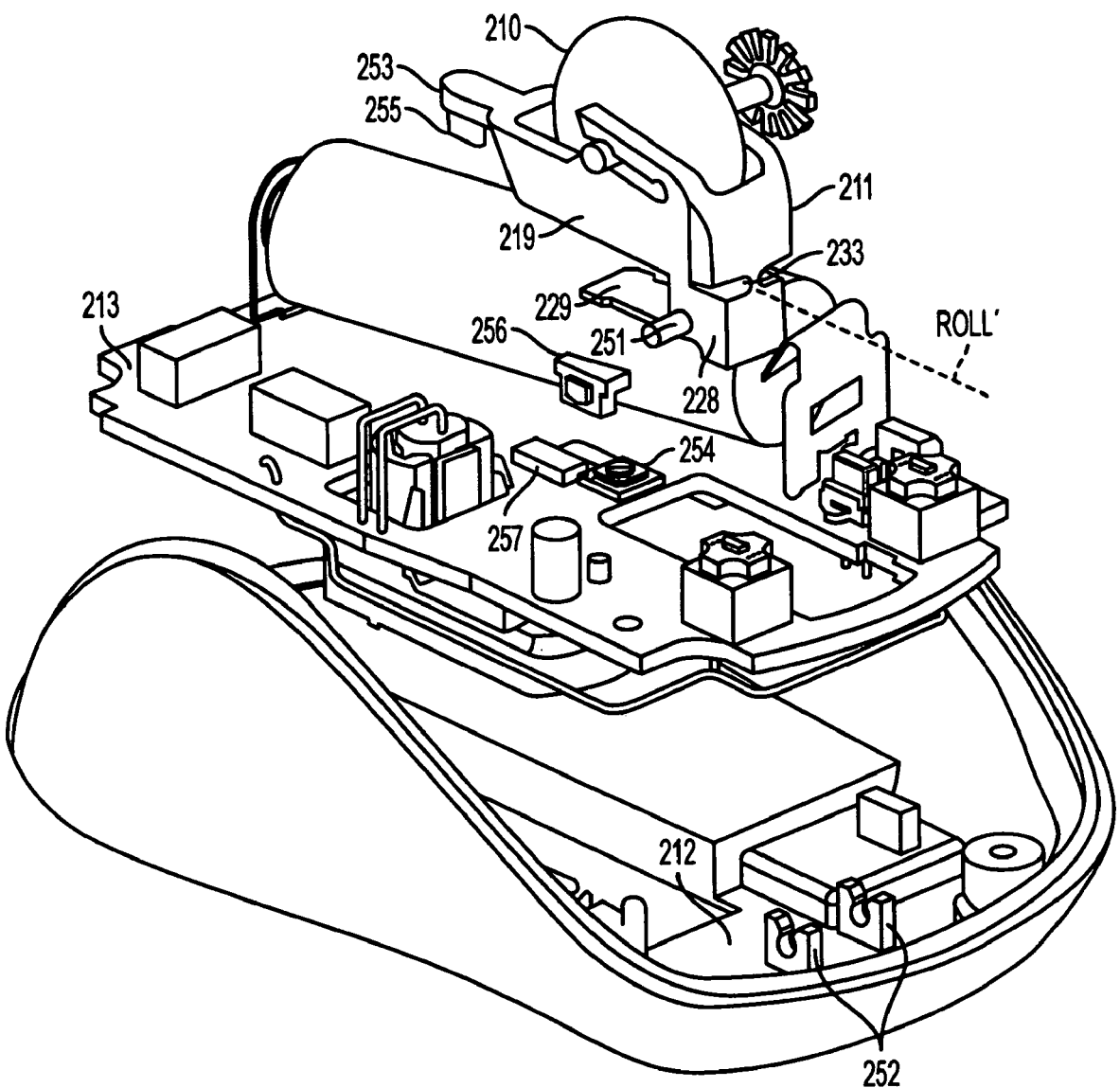
FIG. 25 is an exploded view of a computer mouse implementing a scroll wheel assembly according to at least one additional embodiment of the invention.
Figure 27:
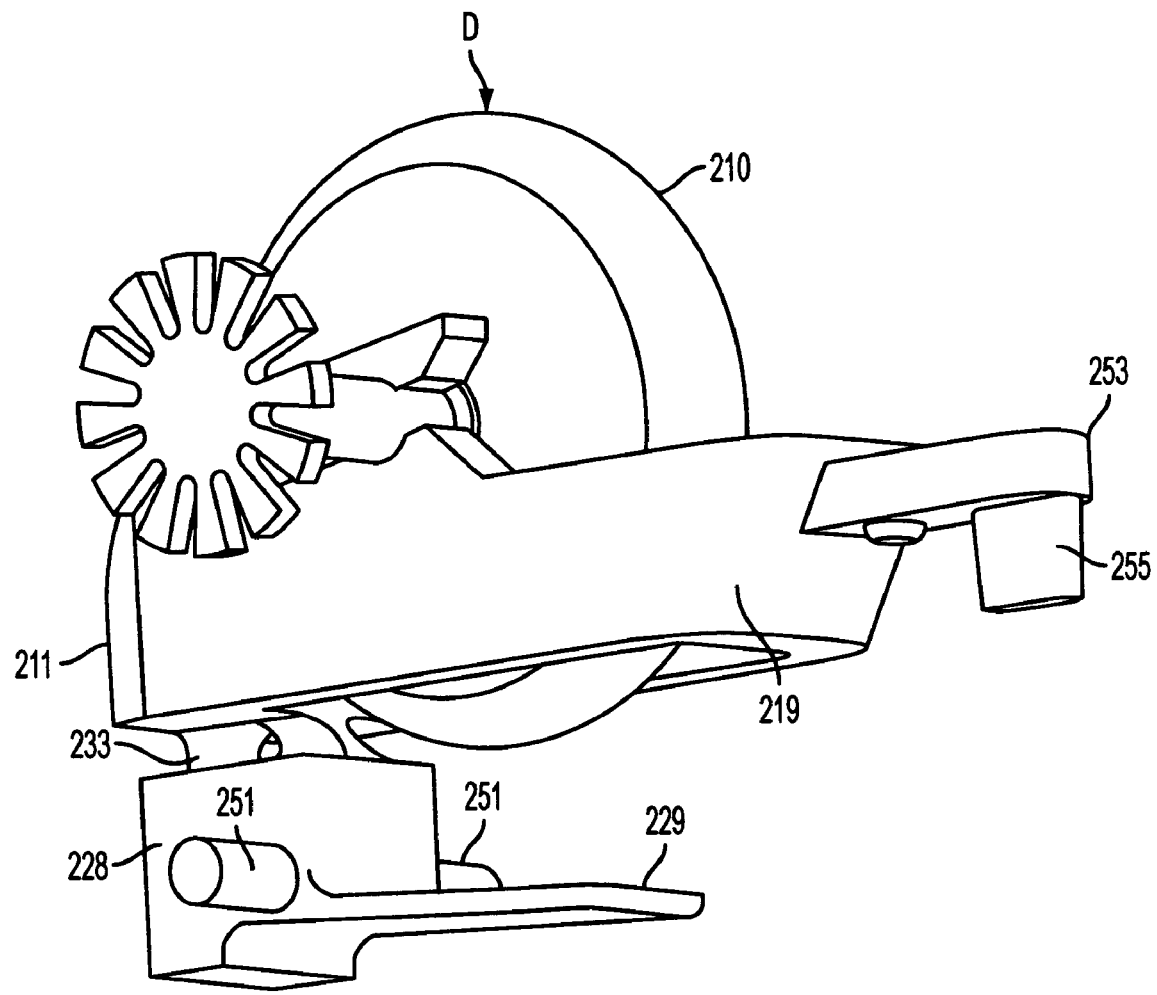
FIG. 27 is a perspective view of the carriage and scroll wheel of FIG. 25.
Figure 29:
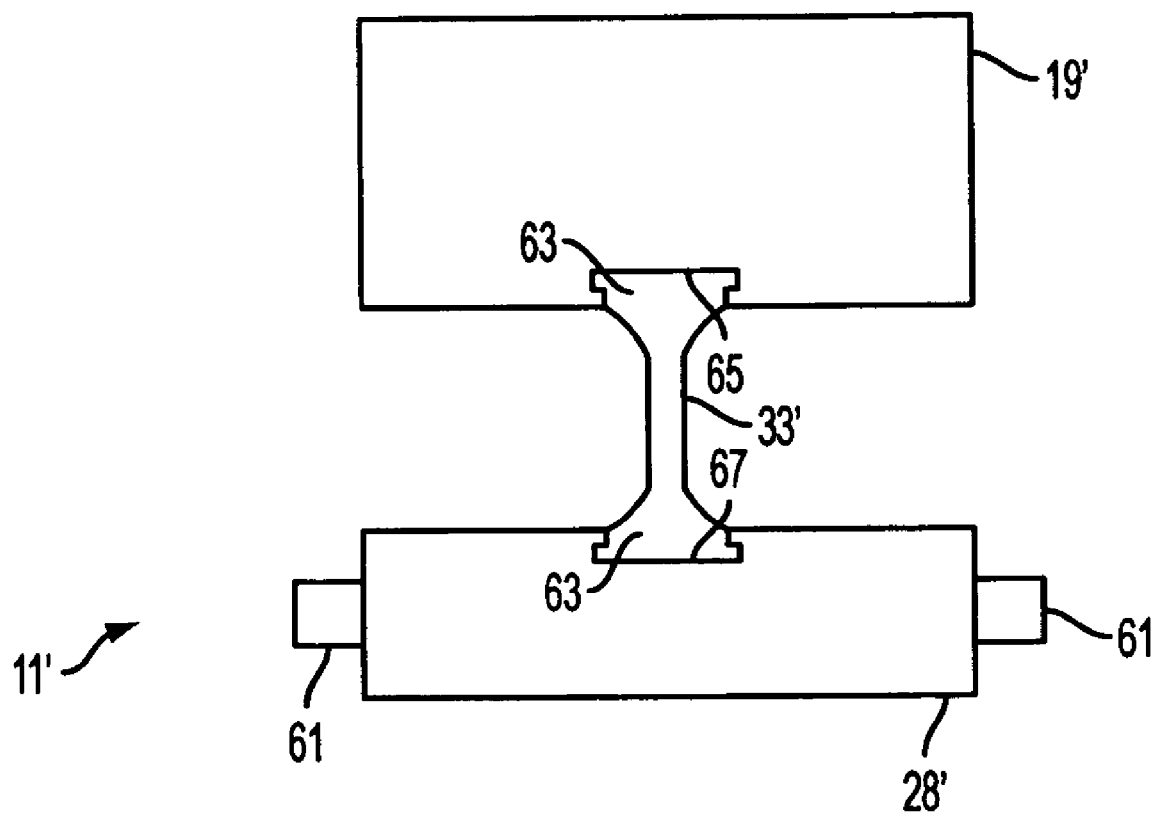
FIG. 29 is a rear view of a scroll wheel carriage according to additional embodiments of the invention.

FIG. 3 is a perspective view of the scroll wheel assembly of FIG. 2 from a slightly different angle, and with PCB 13, switches 14 and 15, and optical pair 16 omitted for clarity. As seen more clearly in FIG. 3, scroll wheel axle 17 rests within and is retained by an axle guide 22 formed by opposing tabs 23 of an arm 24 of carriage 11. Carriage 11 moves about pitch axis P (see FIG. 4) by means of a pivot post 25. Pivot post 25 passes through side walls 26 of a channel 27 formed in base 12, as well as through a lower bracket 28 of carriage 11 resting within channel 27. A hole in lower bracket 28 (not shown in FIG. 3, but seen in FIG. 10) serves as a fixture facilitating movement of carriage 11 relative to base 12. In other embodiments, carriage 11 could have another type of fixture facilitating the same movement (e.g., an integral axle extending from the sides of lower bracket 28, similar to what is illustrated in FIGS. 25, 27 and 29 in connection with other embodiments). Tang 29 extends from lower bracket 28 and contacts floor 30 of channel 27. Tang 29 is resilient and acts as a spring biasing carriage 11 and scroll wheel 10 away from base 12. When sufficient downward force is applied to scroll wheel 10 in the direction of arrow D, tang 29 is deflected, and scroll wheel 10 moves toward base 12.

Figure 4:
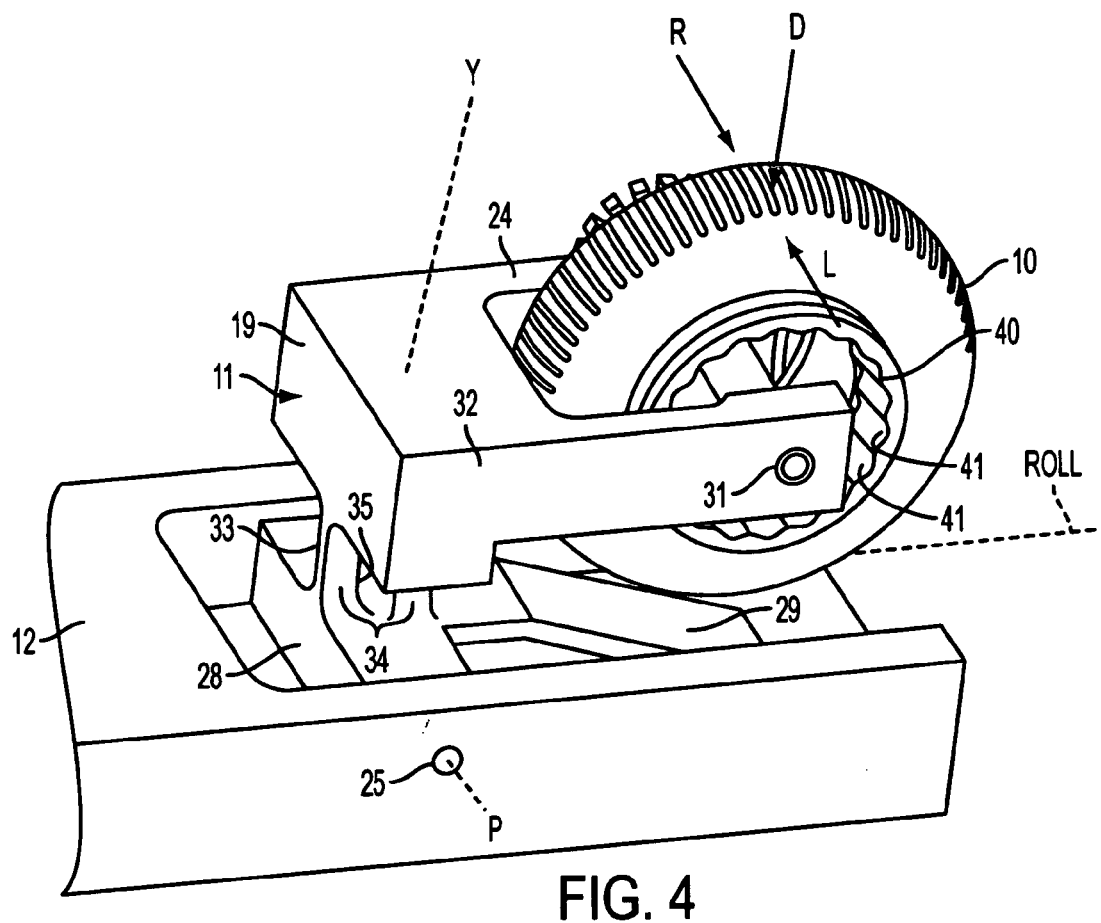

FIG. 4 a perspective view of the scroll wheel assembly of FIG. 2 from another angle. PCB 13, switches 14 and 15, and optical pair 16 have also been omitted from FIG. 4. The opposite end of scroll wheel axle 17 rests within an axle hole 31 formed in arm 32 of carriage 11. Flexure 33 is partially visible in FIG. 4. As used herein, a "flexure" is a bendable component (or collection of components). Flexure 33, which includes a pair of vertical members 34 separated by a space 35, connects lower bracket 28 with upper bracket 19. Vertical members 34 are sized and sufficiently flexible to permit upper bracket 19 (holding arms 24 and 32 holding scroll wheel 10) to move relative to lower bracket 28. In this manner, upper bracket 19 moves generally about the Roll axis, thereby moving scroll wheel 10 about the Roll axis. Vertical members 34 are sufficiently resilient so as to bias upper bracket 19 against moving relative to lower bracket 28, thereby tending to center upper bracket 19 (and scroll wheel 10).

When force is applied in the L or R directions, there may be some minor movement of upper bracket 19 about additional axes, as well as minor translational movement. However, flexure 33 is sized and shaped so that force on scroll wheel 10 in direction D of sufficient magnitude to deflect tang 29 and engage center switch 36 (see FIG. 7) is insufficient to cause any substantial movement of upper bracket 19 relative to lower bracket 28 about any axes parallel to pitch axis P. In at least some embodiments, flexure 33 is sized so as to allow movement of upper bracket 19 about the Roll axis in response to a L-direction (or R-direction) force between 0.25 and 0.50 pounds.

Figure 5:
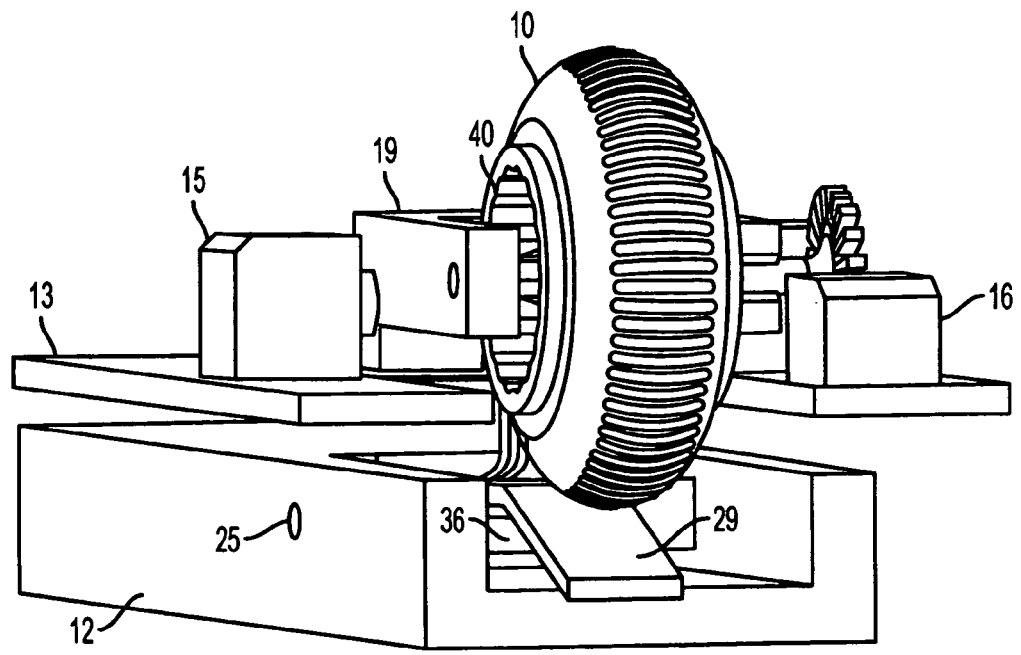
Figure 6:
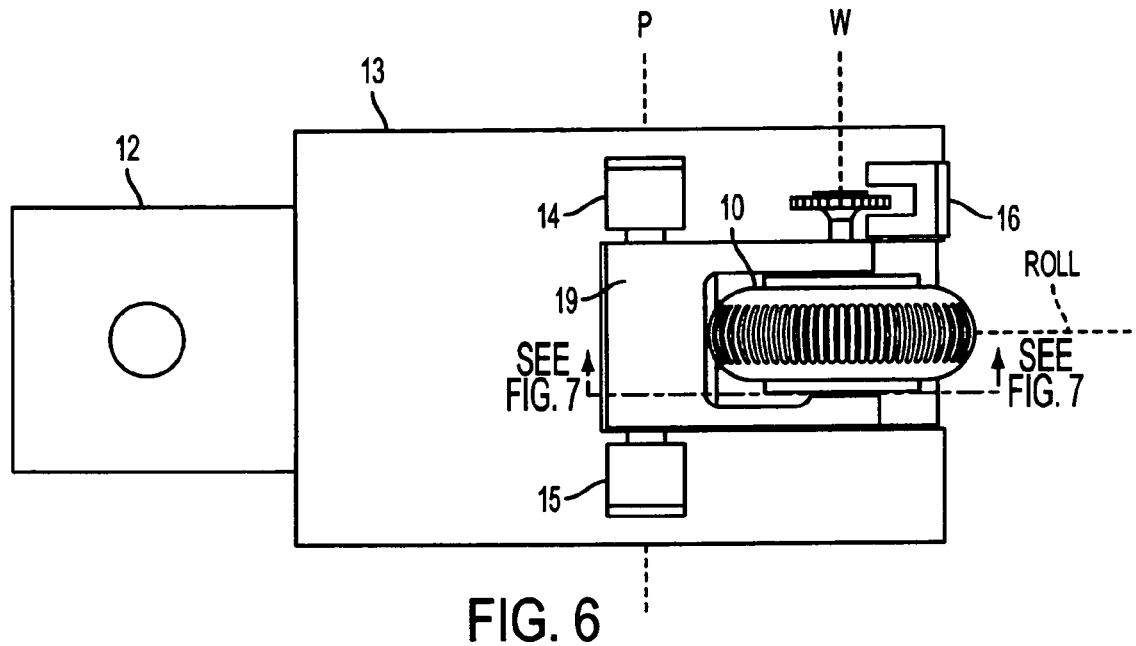
FIG. 6 is a top view of the scroll wheel assembly of FIG. 2.
Figure 7:
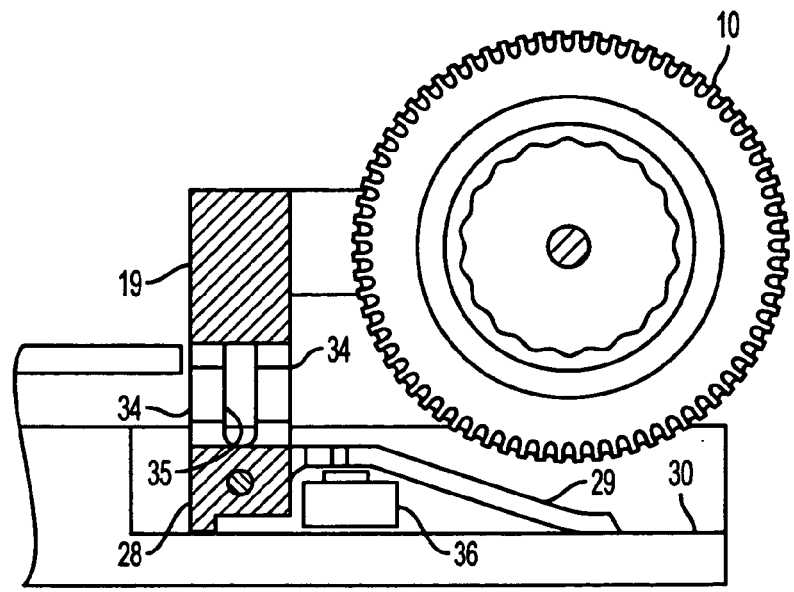
FIG. 7 is a partial sectional view of the scroll wheel assembly of FIG. 2, taken along the line indicated in FIG. 6.

FIG. 5 is a front side perspective view of the scroll wheel assembly of FIG. 2, but with PCB 13, right horizontal scroll switch 15 and optical pair 16 shown. The front portion of base 12 has been cut back somewhat. Left horizontal scroll switch 14 is obscured in the view of FIG. 5. Center switch 36, located between tang 29 and floor 30, is partially visible in FIG. 5. FIG. 6 is a top view of the scroll wheel assembly of FIG. 2. FIG. 7 is a partial sectional view, taken along the line indicated in FIG. 6, showing the location of center switch 36.

Figure 8:
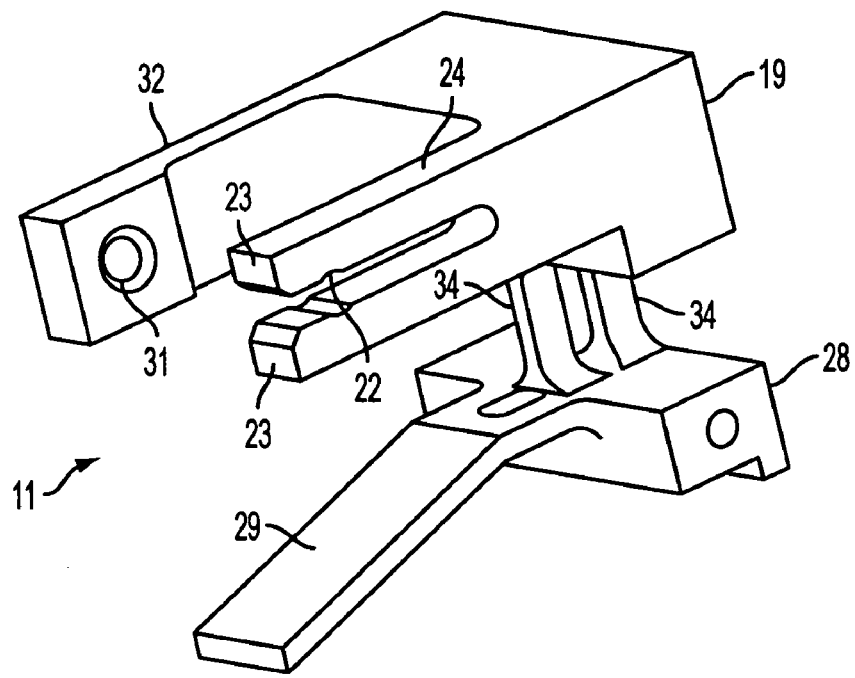
FIG. 8 is a perspective view of a scroll wheel carriage according to at least some embodiments of the invention.
Figure 9:
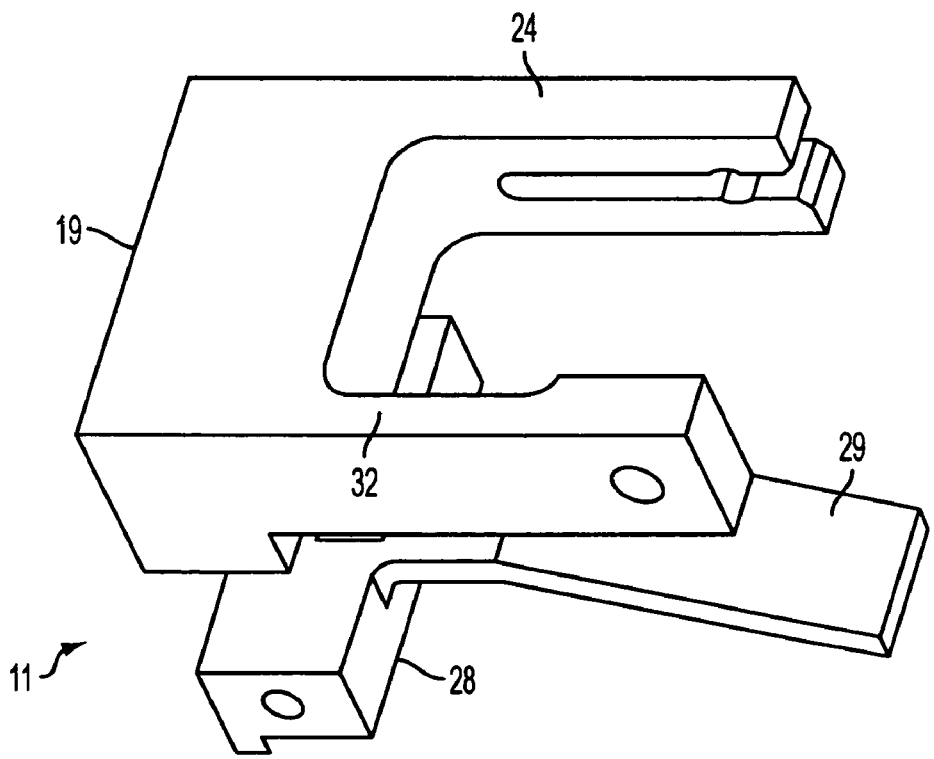
FIG. 9 is another perspective view of a scroll wheel carriage of FIG. 8.

FIG. 8 is a perspective view of carriage 11 alone. In the embodiment of FIGS. 2-15, scroll wheel 10 is installed by positioning one end of scroll wheel axle 17 in hole 31 of arm 32. The opposing side of axle 17 is then pressed through tabs 23 into axle guide 22. FIG. 9 is another perspective view of carriage 11.

FIGS. 10-15 are, respectively, top, rear, right side, front, left side and bottom views of carriage 11. In at least one embodiment, carriage 11 is machined, molded or otherwise formed as a single piece of acetyl resin or other plastic having a high fatigue limit and high maximum strain limit. In at least one embodiment, carriage 11 is formed from the material sold under the trade name DELRIN 100P by E.I. du Pont de Nemours and Company of Wilmington, Del. Other possible materials for carriage 11 include nylon and polypropylene. Values for the dimensions of FIGS. 10-15, according to at least some embodiments, are provided in Table 1, where references in Table 1 correspond to like references in FIGS. 10-15.

TABLE 1

| Dimension | Value (mm) |
|---|---|
| a | 25.4 ± 0.1 |
| b | 16 ± 0.1 |
| c | 2.9 ± 0.1 |
| d | 11.8 ± 0.1 |
| e | 1 ± 0.1 |
| f | 6.048 ± 0.1 |
| g | 1.6 ± 0.1 |
| h | 19.85 ± 0.1 |
| i | 8.5 ± 0.1 |

TABLE 1-continued

| Dimension | Value (mm) |
|---|---|
| j | 6.35 ± 0.1 |
| k | 1 ± 0.1 |
| l | 1.6 ± 0.1 |
| m | 17.7 ± 0.1 |
| n | 5.675 ± 0.1 |
| o | 6.35 ± 0.1 |
| p | 8.35 ± 0.1 |
| q | 1 ± 0.1 |
| r | 6 ± 0.1 |
| s | 3 ± 0.1 |
| t | 3 ± 0.1 |
| u | 6 ± 0.1 |
| v | 2.05 + 0.05/−0.0 |
| w | 2 ± 0.1 |
| x | 1.69 + 0.05/−0.0 |
| y | 2 ± 0.1 |
| z | 3 ± 0.1 |
| aa | 1.5 ± 0.1 |
| bb | 1 ± 0.1 |
| cc | 2 ± 0.1 |
| dd | 0.8 ± 0.1 |
| ee | 2.6 ± 0.1 |
| ff | 1.6 ± 0.1 |
| gg | 11.9 ± 0.1 |
| hh | 0.8 ± 0.1 |
| ii | 1.2 ± 0.1 |
| kk | 4 ± 0.1 |
| ll | 5 ± 0.1 |
| mm | 25.4 ± 0.1 |
| nn | 19.4 ± 0.1 |
| oo | 1.2 ± 0.1 |
| pp | 0.5 ± 0.1 |
| qq | 0.8 ± 0.1 |
| rr | 3.175 ± 0.1 |
| ss | 2 ± 0.1 |
| tt | 2.175 ± 0.1 |
| uu | 6.35 ± 0.1 |
| vv | 2 ± 0.1 |
| ww | 6 ± 0.1 |

Figure 16:
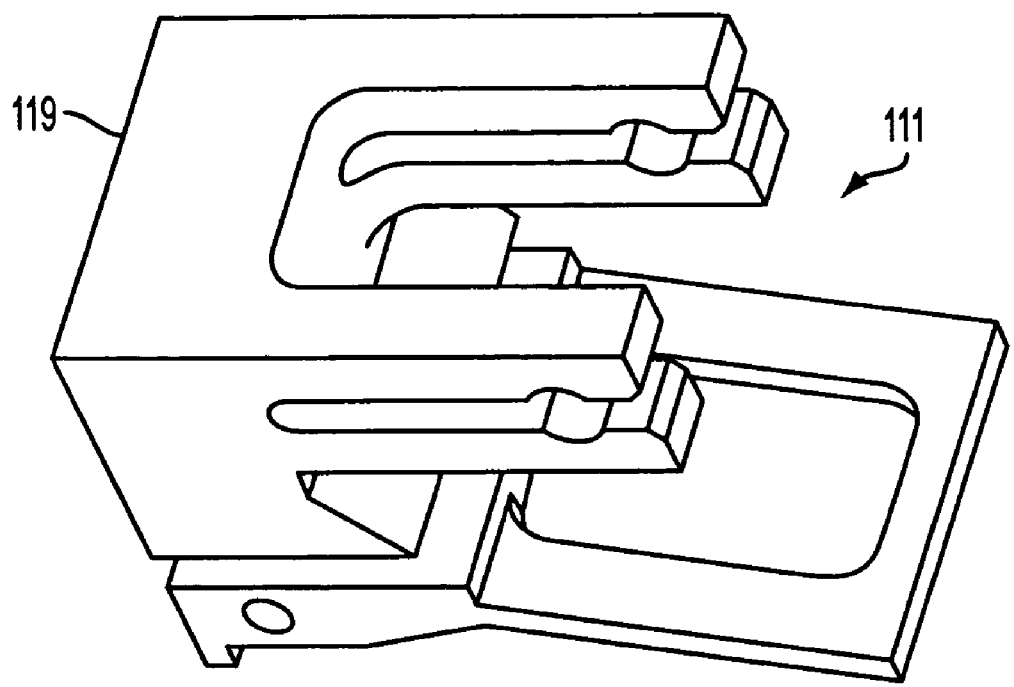
FIG. 16 is perspective view of a scroll wheel carriage according to another embodiment of the invention.
Figure 17:
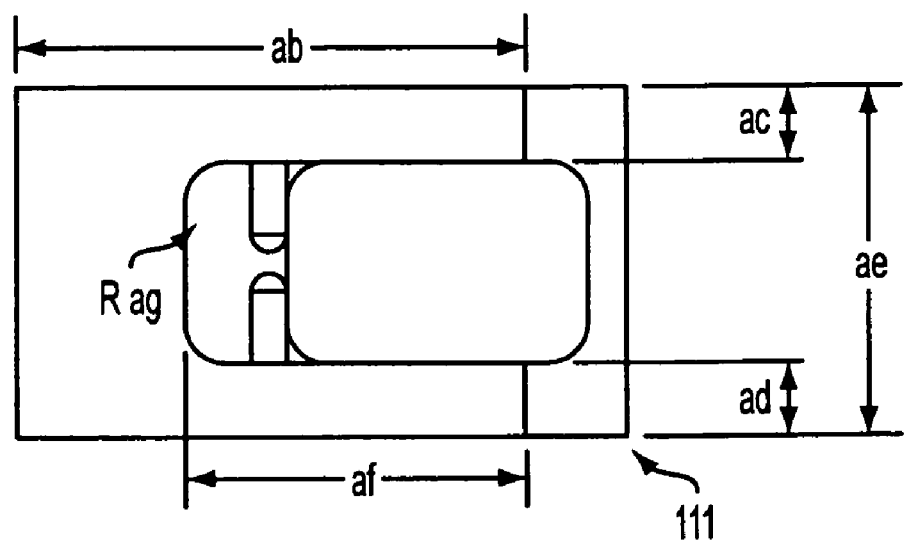
FIG. 17 is a top view of the scroll wheel carriage of FIG. 16.
Figure 18:
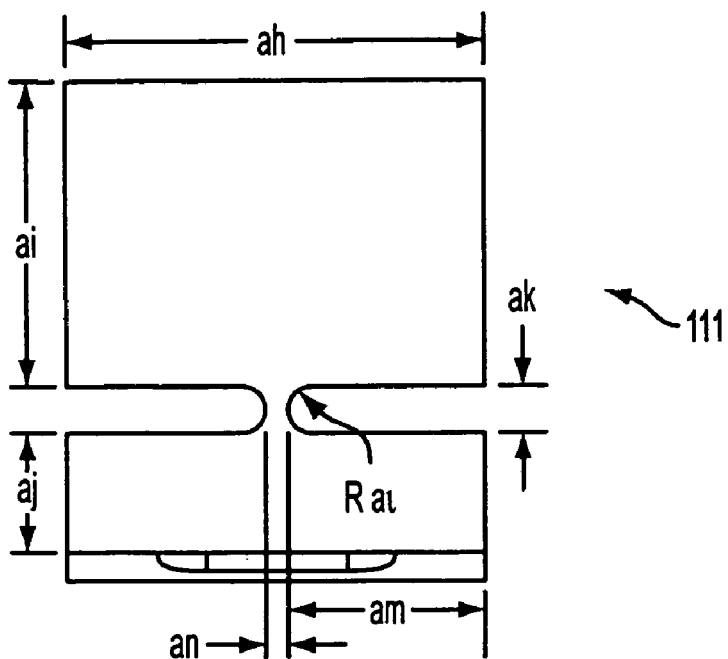
FIG. 18 is a rear view of the scroll wheel carriage of FIG. 16.
Figure 19:
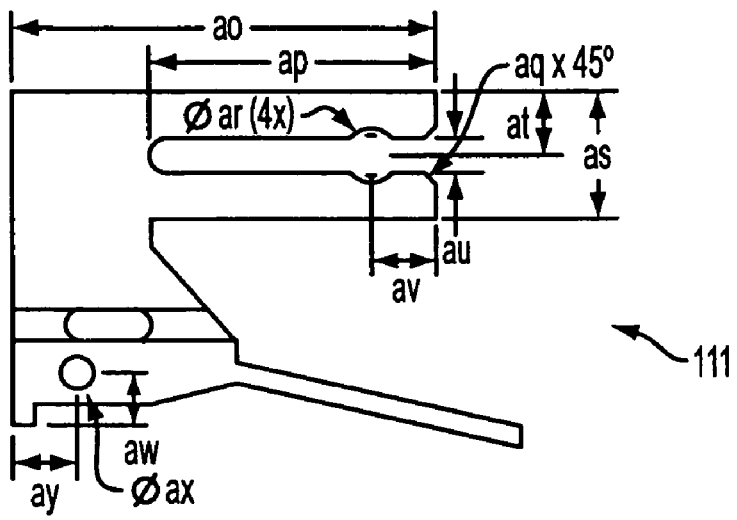
FIG. 19 is a right side view of the scroll wheel carriage of FIG. 16.
Figure 20:
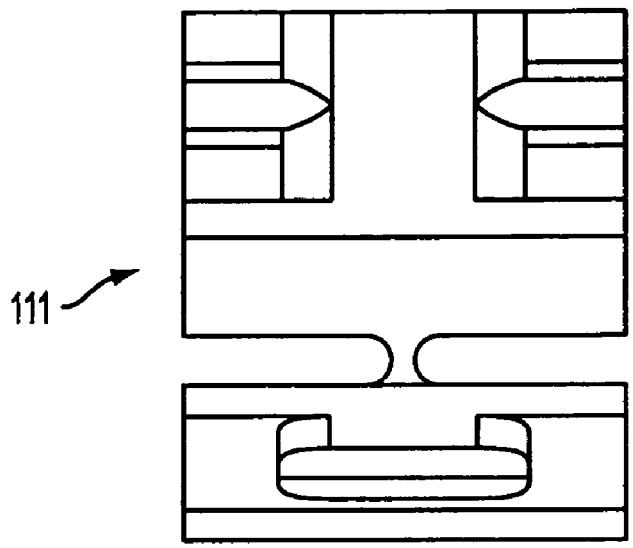
FIG. 20 is a front view of the scroll wheel carriage of FIG. 16.
Figure 21:
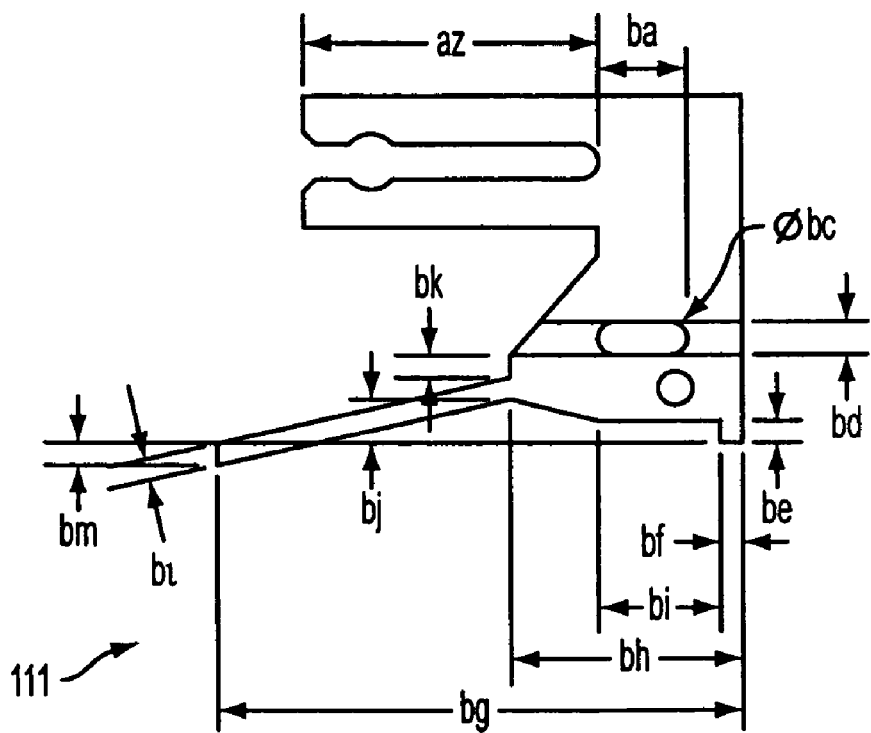
FIG. 21 is a left side view of the scroll wheel carriage of FIG. 16.
Figure 22:
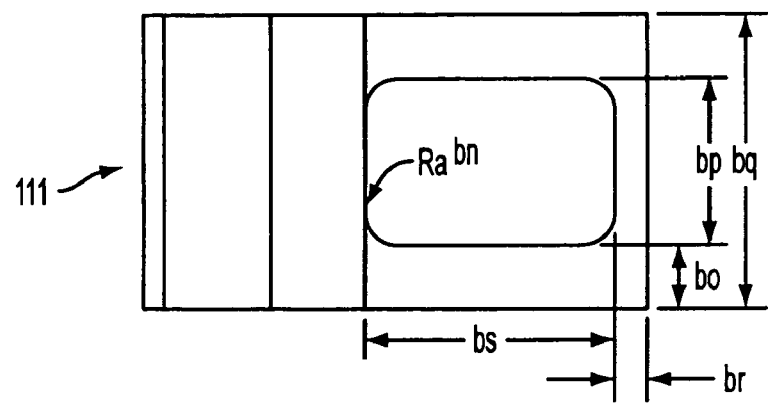
FIG. 22 is a bottom view of the scroll wheel carriage of FIG. 16.

FIG. 16 is a perspective view of a scroll wheel carriage 111 according to at least one additional embodiment of the invention. FIGS. 17-22 are, respectively, top, rear, right side, front, left side and bottom views of carriage 111. Carriage 111 is also formed as a single piece of acetyl resin, nylon, polypropylene or other plastic material. Values for the dimensions of FIGS. 17-22, according to at least some embodiments, are provided in Table 2, where references in Table 2 correspond to like references in FIGS. 17-22.

TABLE 2

| Dimension | Value (mm) |
|---|---|
| ab | 20 ± 0.2 |
| ac | 3 ± 0.2 |
| ad | 3 ± 0.2 |
| ae | 14 ± 0.2 |
| af | 13.5 ± 0.2 |
| ag | 1.6 ± 0.2 |
| ah | 14 ± 0.2 |
| ai | 10.4 ± 0.2 |
| aj | 4 ± 0.2 |
| ak | 1.6 ± 0.2 |
| al | 0.8 ± 0.2 |
| am | 6.6 ± 0.2 |
| an | 0.8 ± 0.2 |
| ao | 20 ± 0.2 |
| ap | 13.5 ± 0.2 |
| aq | 0.5 ± 0.2 × 45° |
| ar | 2.6 ± 0.2 |
| as | 6 ± 0.2 |
| at | 3 ± 0.2 |

TABLE 2-continued

| Dimension | Value (mm) |
|---|---|
| au | 1.6 ± 0.2 |
| av | 3 ± 0.2 |
| aw | 2.5 ± 0.2 |
| ax | 1.6 ± 0.2 |
| ay | 3 ± 0.2 |
| az | 13.5 ± 0.2 |
| ba | 4 ± 0.2 |
| bc | 1.6 ± 0.2 |
| bd | 1.6 ± 0.2 |
| be | 1 ± 0.2 |
| bf | 1 ± 0.2 |
| bg | 24 ± 0.2 |
| bh | 10.5 ± 0.2 |
| bi | 6 ± 0.2 |
| bj | 2 ± 0.2 |
| bk | 1 ± 0.2 |
| bl | .976 ± 0.2 |
| bm | 1 ± 0.2 |
| bn | 1.6 ± 0.2 |
| bo | 3 ± 0.2 |
| bp | 8 ± 0.2 |
| bq | 14 ± 0.2 |
| br | 1.5 ± 0.2 |
| bs | 12 ± 0.2 |

The dimensions provided in Tables 1 and 2 are only examples of dimensions for a carriage according to embodiments of the invention. The dimensions can be scaled or otherwise altered. Indeed, the invention includes embodiments in which one or more of the features shown for carriages 11 and 111 (together with associated dimensions) are absent. The invention further includes embodiments in which a carriage may include features not shown in FIGS. 8-22 or in other drawing figures.

Figure 23:
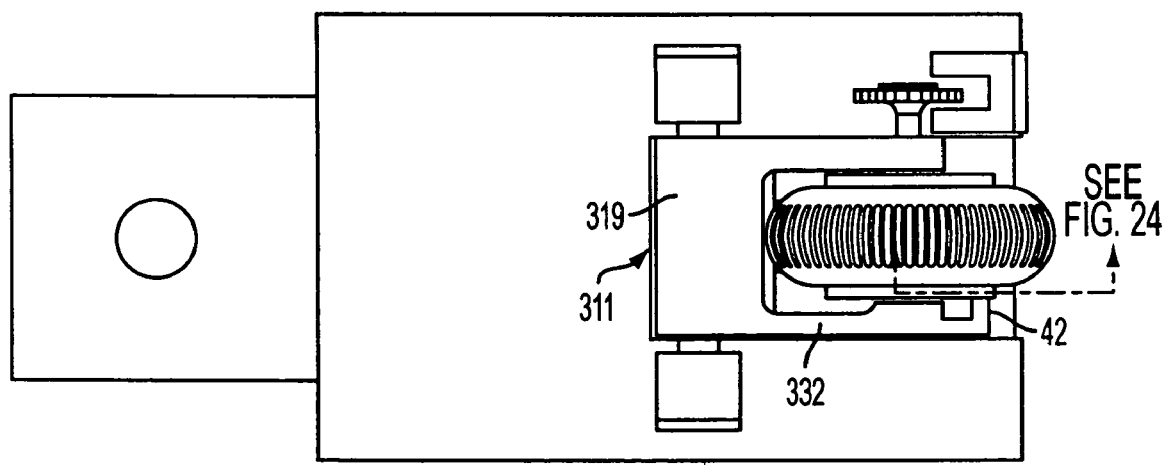
FIG. 23 is a top view of a scroll wheel assembly according to at least one additional embodiment of the invention.
Figure 24:
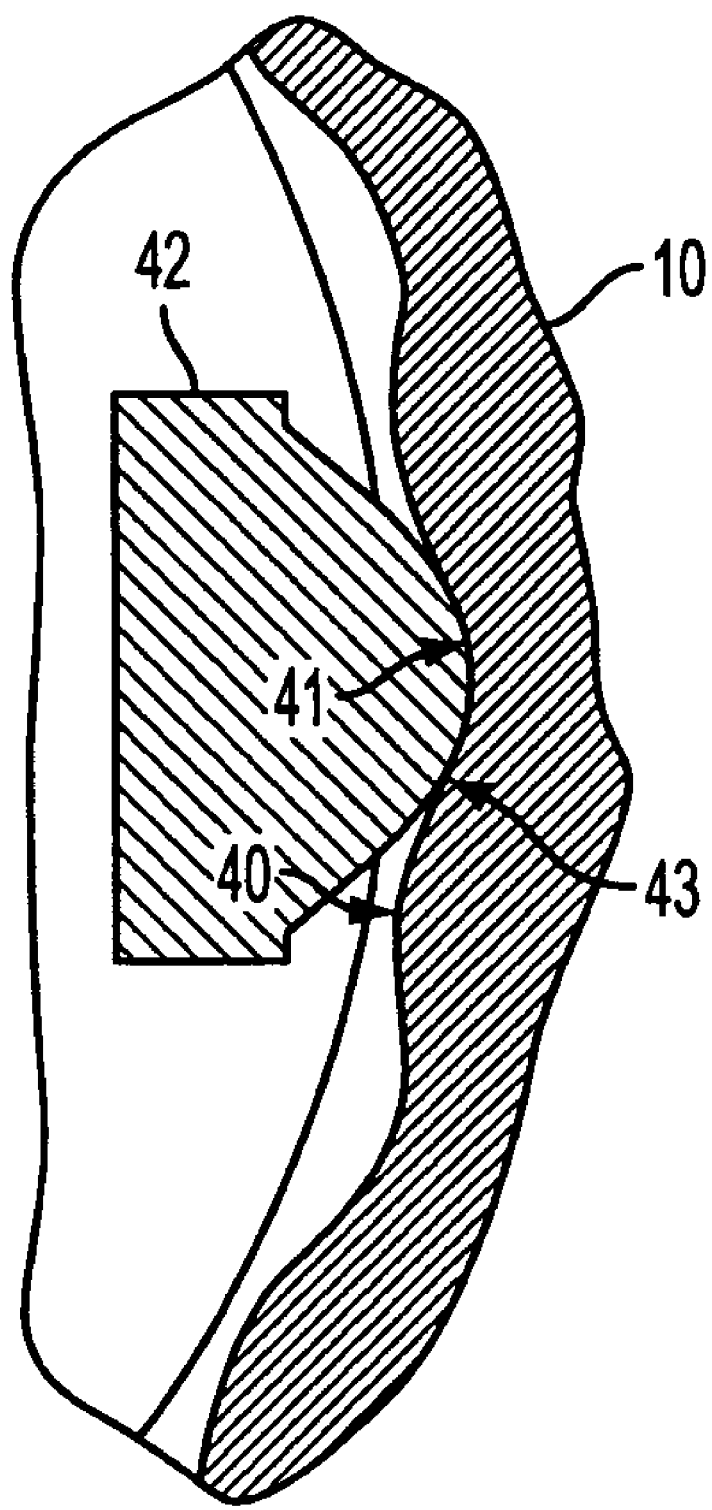
FIG. 24 is a partial sectional view taken along the line indicated in FIG. 23.

In at least some embodiments, and as shown in FIGS. 4 and 5, scroll wheel 10 is substantially open on at least one side, and has an exposed inner circumferential surface 40. Evenly spaced along inner circumferential surface 40 are a series of peaks and troughs forming detents 41. In at least some embodiments, as shown in FIG. 23, a follower 42 extends from arm 332 (in turn attached to upper bracket 319 of carriage 311, which is otherwise similar to carriage 11) and contacts inner circumferential surface 40. Follower 42 projects inwardly towards scroll wheel 10 and is used to provide indexed wheel motion. After assembly, and as shown in FIG. 23, follower 42 is in contact with inner circumferential surface 40. As scroll wheel 10 rotates, follower 42 is alternatively forced out of, and allowed to rest within, detents 41. As follower 42 is forced out of a detent 41, it is pushed radially inward against a radially outward bias of the spring force of the arm of follower 42. In this manner, indexed rotation of scroll wheel 10 is obtained, and scroll wheel 10 is prevented from rotating except when such rotation is desired. As seen in FIG. 24, a partial sectional view taken from the location shown in FIG. 23, follower 42 has an end 43 that generally matches the trough shape. Example dimensions for follower 42 are provided in commonly-owned copending U.S. patent application Ser. No. 10/158,996 (titled "Modular Scroll Wheel With Integral Detent-Engaging Spring Tab" and filed Jun. 3, 2002), which application is incorporated by reference herein.

Figure 26:
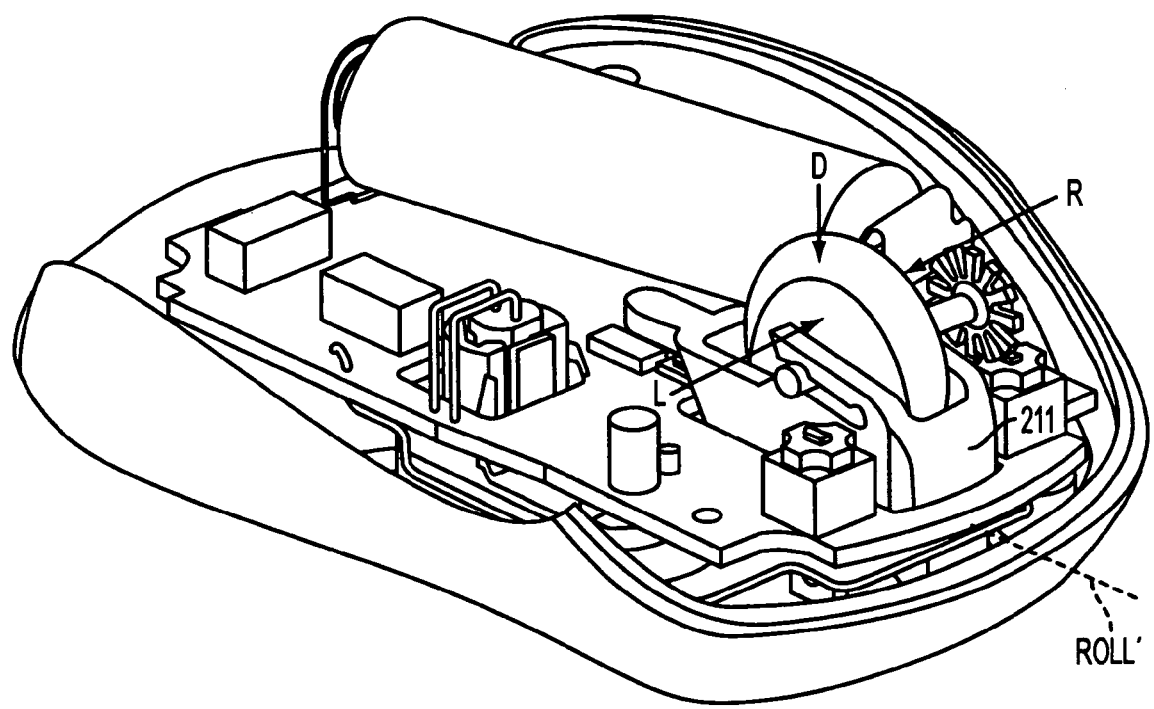
FIG. 26 is an assembled view of the computer mouse of FIG. 25, with a portion of the lower case removed.

FIG. 25 is an exploded view of a computer mouse having a scroll wheel assembly according to at least one additional embodiment of the invention. The upper case and mouse buttons are not shown. In the embodiment of FIG. 25, scroll wheel 210 is held within a carriage 211. Carriage 211 has an upper bracket 219 and a lower bracket 228 connected by a flexure 233. Carriage 211 further has a pair of pivot axles 251 extending from opposite sides of lower bracket 228 which fit into pivot axle guides 252 extending from base 212. When the mouse of FIG. 25 is assembled, tang 229 contacts base 212 and biases carriage 211 (and scroll wheel 210) away from base 212. When downward force in the direction of arrow D is exerted upon scroll wheel 210 (shown in FIG. 26), the underside of arm 253 contacts center switch 254 (located on PCB 213). In response to sideways force upon scroll wheel 210, upper bracket 219 moves relative to lower bracket 228. When scroll wheel 210 is pressed in direction L (shown in FIG. 26) with sufficient force, upper bracket 219 moves relative to lower bracket 228 about a roll axis (labeled "Roll'"). When this occurs, a downwardly extending paddle 255 on arm 253 makes contact with left horizontal scroll switch 256. Left horizontal scroll switch 256 is similar to left horizontal scroll switch 14 (FIG. 2). In response to actuation of switch 256, a signal is sent by mouse electronics to a computer, which signal may be converted into a command causing horizontal scrolling of the display to the left. When scroll wheel 210 is pressed in direction R (shown in FIG. 26) with sufficient force, upper bracket 219 moves in the opposite direction about the Roll' axis, and paddle 255 makes contact with right horizontal scroll switch 257. Right horizontal scroll switch 257 is similar to right horizontal scroll switch 15 (FIG. 2). In response to actuation of switch 257, a signal is sent by mouse electronics to a computer, which signal may be converted into a command causing horizontal scrolling of the display to the right. FIG. 27 is a perspective view of carriage 211 and scroll wheel 210. In at least some embodiments, flexure 233 has substantially the same dimensions, as well as substantially the same location relative to the rotational axis of an installed scroll wheel, as is shown with regard to carriage 11 (FIGS. 9-15). In at least some additional embodiments, flexure 233 has substantially the same dimensions, as well as substantially the same location relative to the rotational axis of an installed scroll wheel, as is shown with regard to carriage 111 (FIGS. 16-22).

Figure 10:
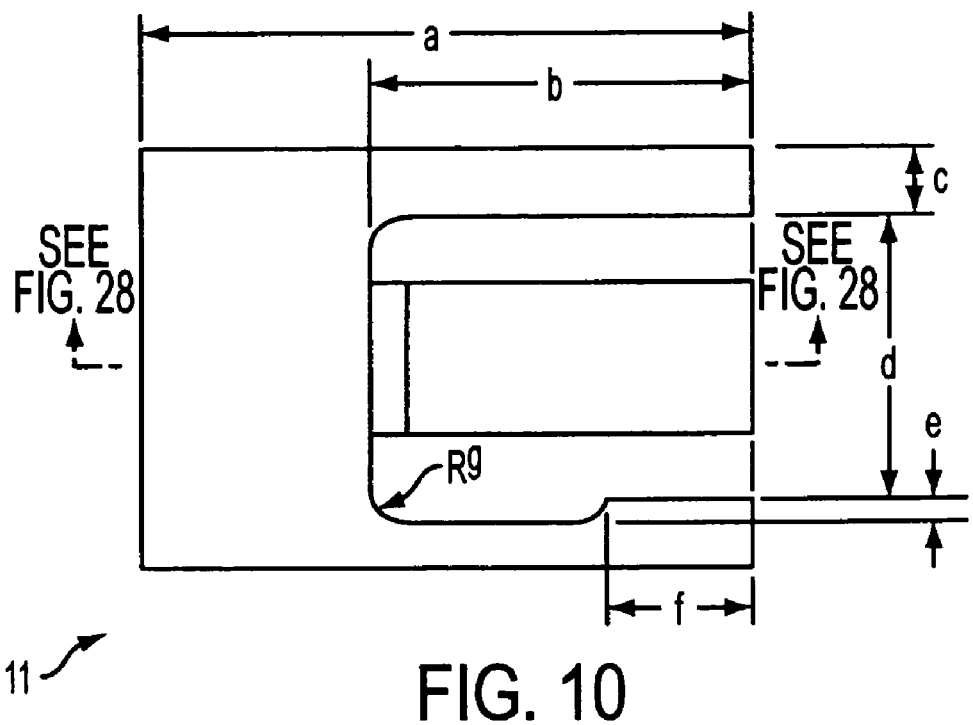
FIG. 10 is a top view of the scroll wheel carriage of FIG. 9.
Figure 11:
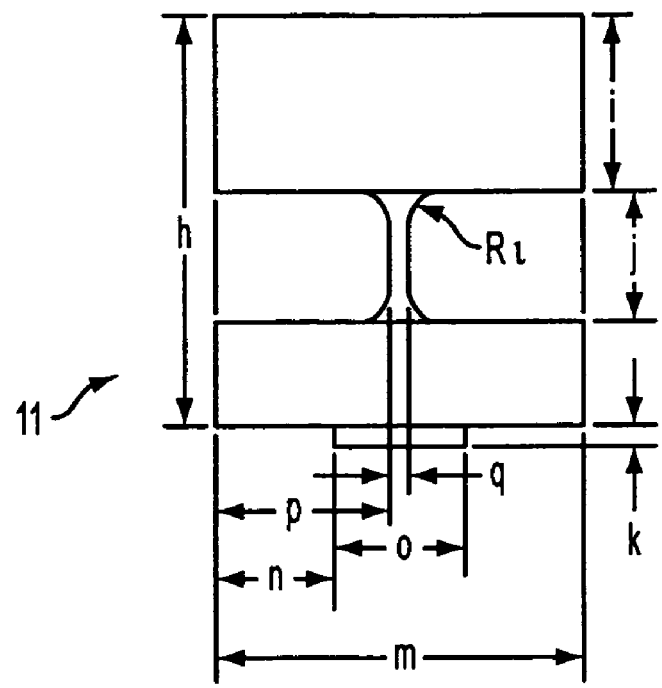
FIG. 11 is a rear view of the scroll wheel carriage of FIG. 9.
Figure 12:
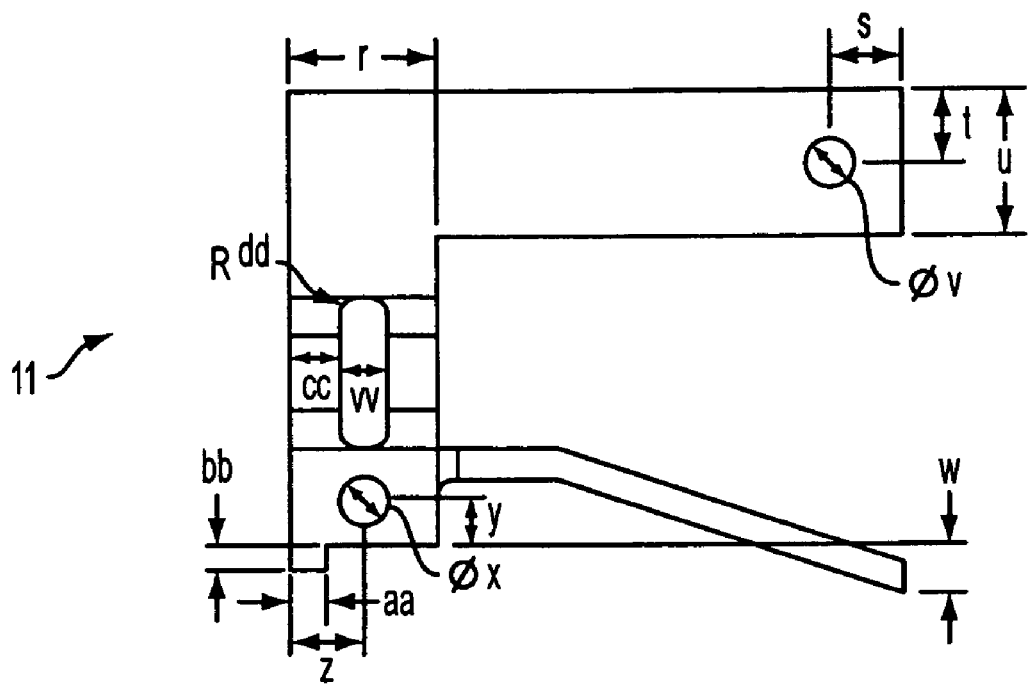
FIG. 12 is a right side view of the scroll wheel carriage of FIG. 9.
Figure 13:
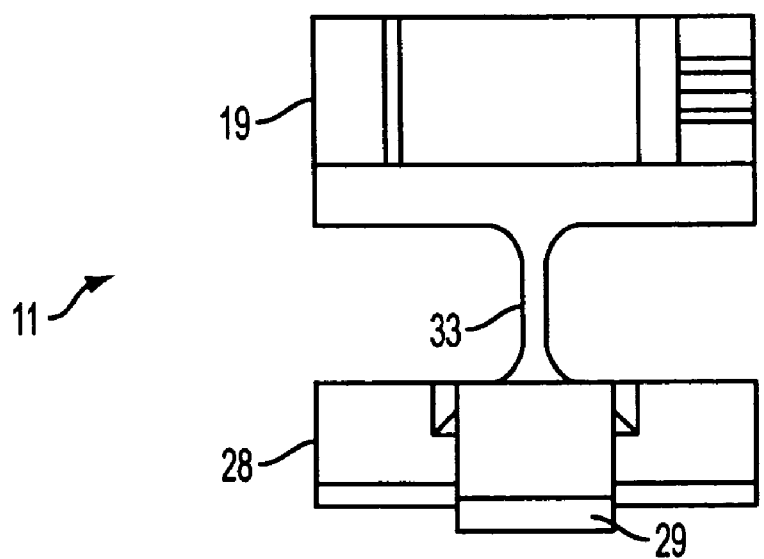
FIG. 13 is a front view of the scroll wheel carriage of FIG. 9.
Figure 14:
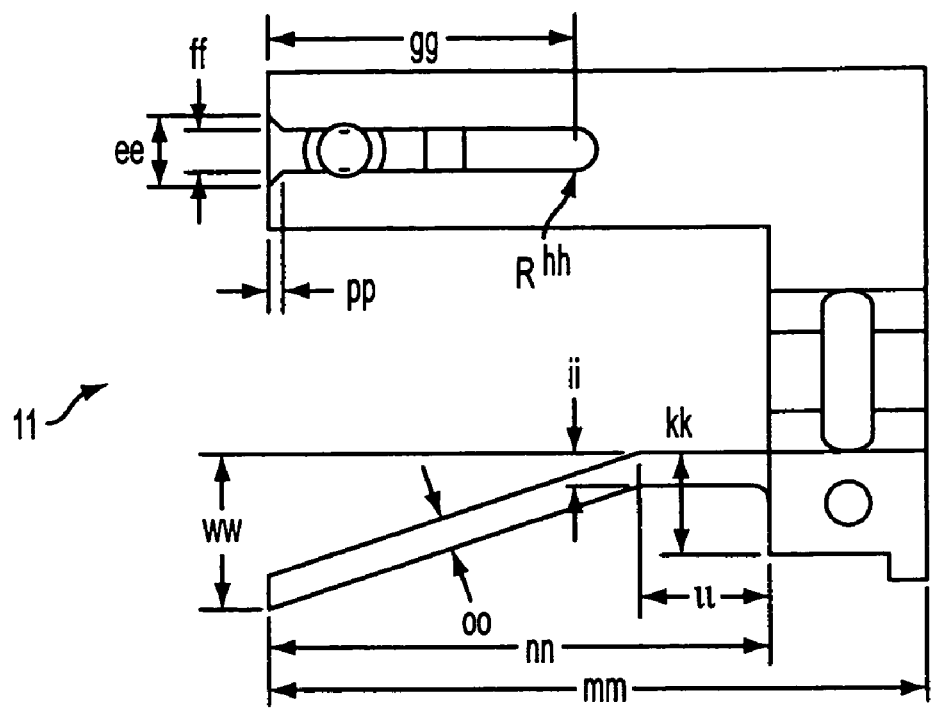
FIG. 14 is a left side view of the scroll wheel carriage of FIG. 9.
Figure 15:
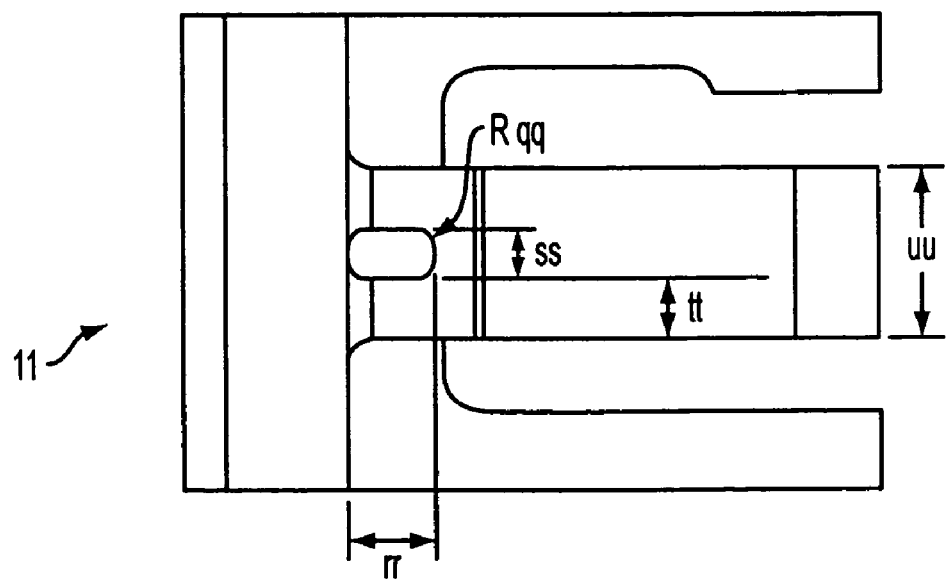
FIG. 15 is a bottom view of the scroll wheel carriage of FIG. 9.
Figure 28:
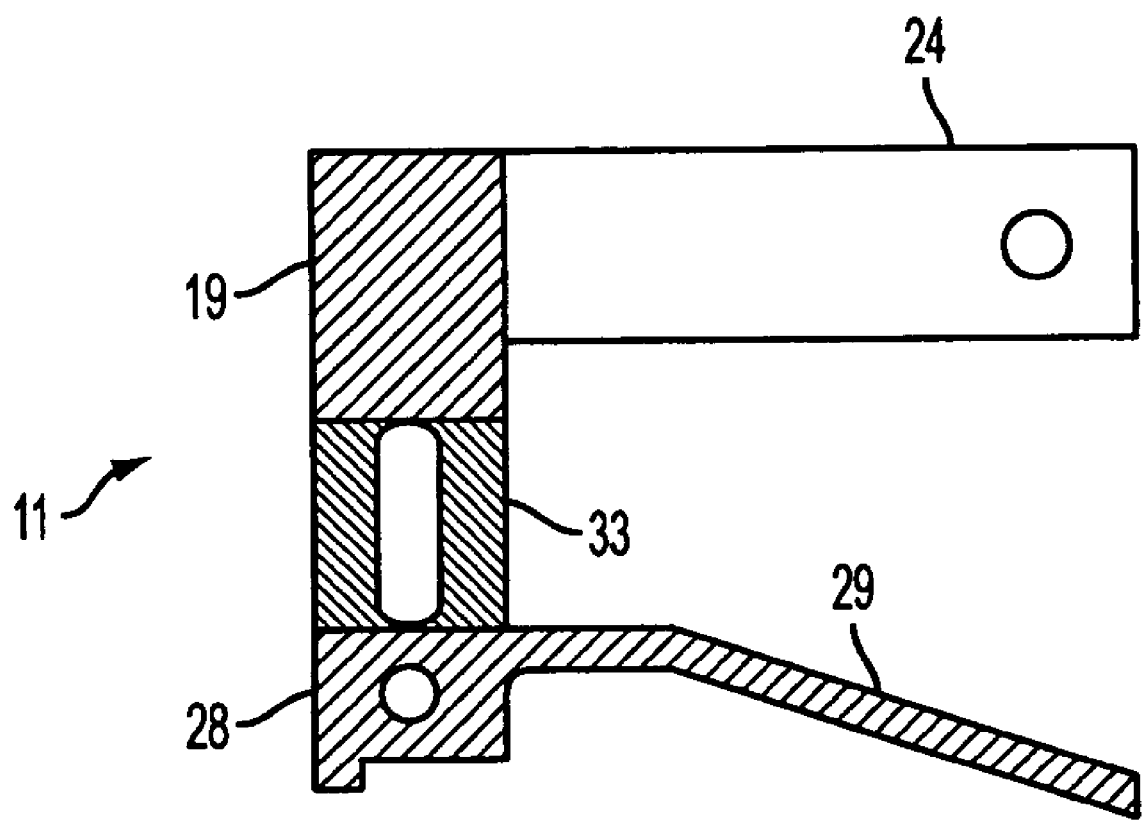
FIG. 28 is a cross section of a carriage according to other embodiments of the invention.

In some embodiments, carriage 211 (as well as carriage 11, carriage 111 and/or carriage 311) is molded using a two-shot (or multi-shot) process so as to mold the upper and lower brackets out of acetyl resin or other type of plastic, and mold the flexure out of a more flexible thermoplastic elastomer (TPE). FIG. 28, a cross-section of another version of carriage 11 taken along the line shown in FIG. 10, illustrates this feature. The upper bracket 19, arm 24, arm 32 (not shown in FIG. 28, but shown in other figures), lower bracket 28 and tang 29 are formed from one material. Flexure 33 is formed of a different material.

In at least some additional embodiments, a carriage is assembled from separate upper bracket, lower bracket, and flexure components. FIG. 29 is a rear view of a carriage 11'. Carriage 11' is similar to carriage 11 (FIGS. 9-15), but lacks a hole in lower bracket 28'. Instead, a pair of axles 61 are formed in the sides of lower bracket 28'. As shown in FIG. 29, lower bracket 28', flexure 33' and upper bracket 19' are formed as three separate pieces. Flexure 33' has "T" shaped protrusions 63 that fit within (and are retained by) sockets 65 and 67 in upper bracket 19' and lower bracket 28', respectively. Upon assembly, lower bracket 28', flexure 33' and upper bracket 19' are held together by glue (not shown), by press fit tolerances, or by other suitable mechanism. For example, additional bumps (not shown) could be formed on protrusions 63, which bumps could fit into detents formed within sockets 65 and 67.

Figure 30:
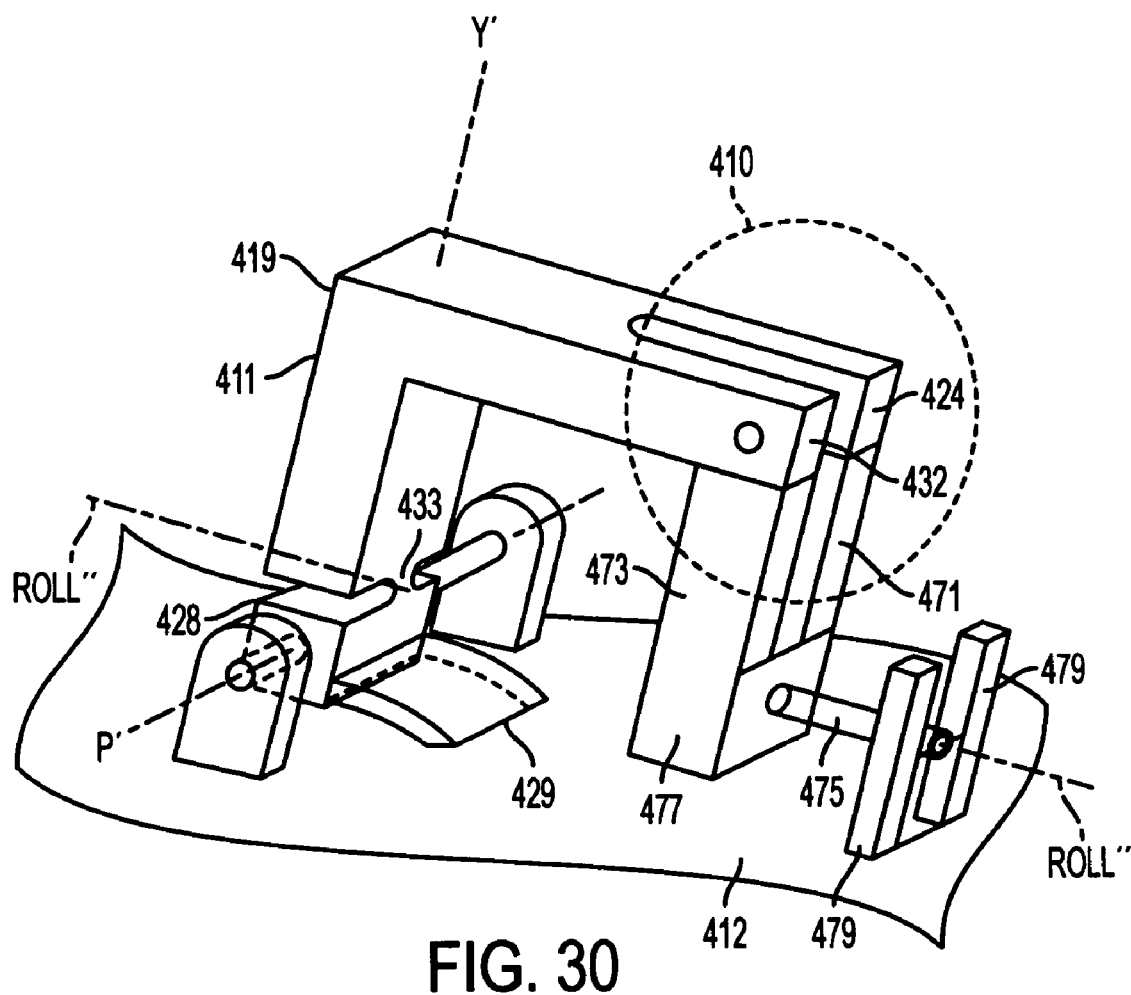
FIG. 30 is a perspective view of a scroll wheel assembly according to further embodiments of the invention.

In yet some additional embodiments, motion of a carriage upper bracket is further constrained. FIG. 30 is a perspective view of one example of such an embodiment. Similar to the embodiments previously described, carriage 411 has a lower bracket 428, a flexure 433 and an upper bracket 419. Similar to other embodiments, lower bracket 428 pivots about a pitch axis P', and is biased upward from a base 412 by a tang 429. A pair of arms 424 and 432 rotatably support a scroll wheel 410 (shown in broken line). Extending downward from arms 424 and 432 are a pair of forward supports 471 and 473. A pin 475 extends from a block 477 at the ends of forward supports 471 and 473. Pin 475 rests within supports 479. Pin 475 may move up and down within supports 479 as carriage 411 moves about axis P', but is constrained from moving sideways relative to supports 479. Pin 475 extends generally along the roll axis (Roll") and constrains upper bracket 419 from twisting (relative to lower bracket 428) about yaw axis Y'.

Figure 31:
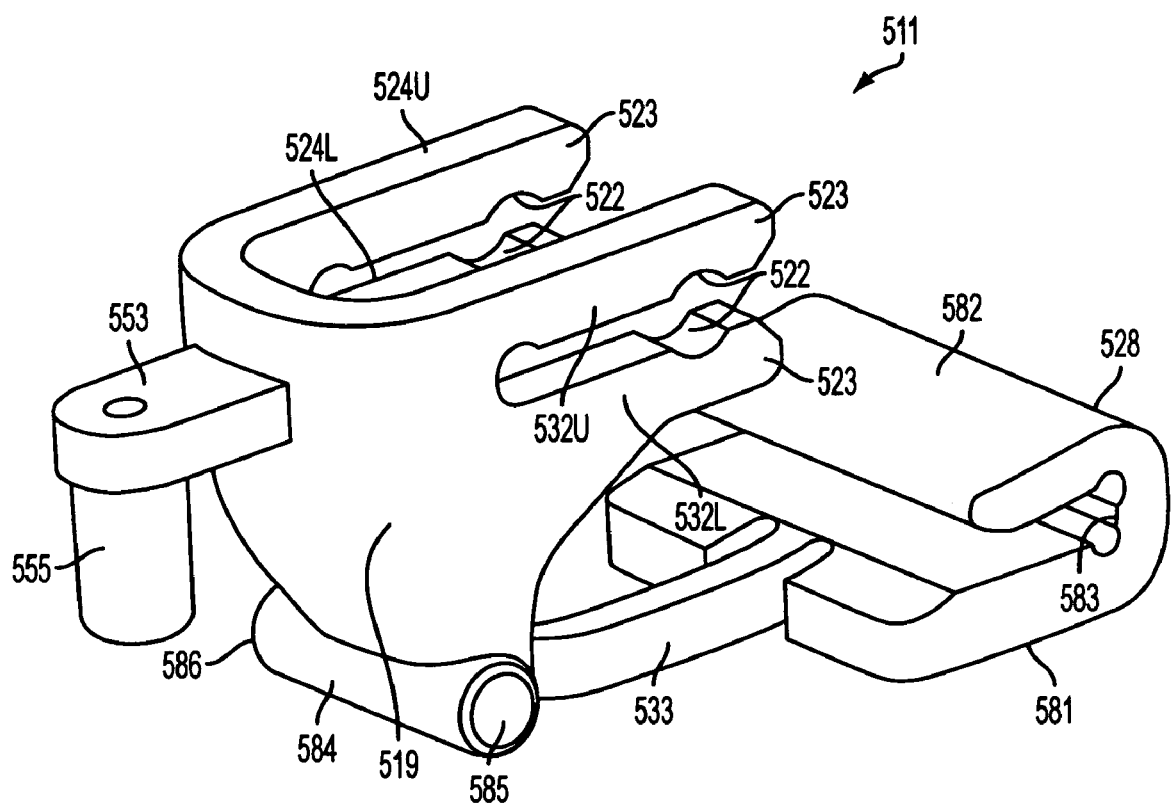
FIG. 31 is a perspective view of a scroll carriage according to at least some additional embodiments of the invention.
Figure 32:
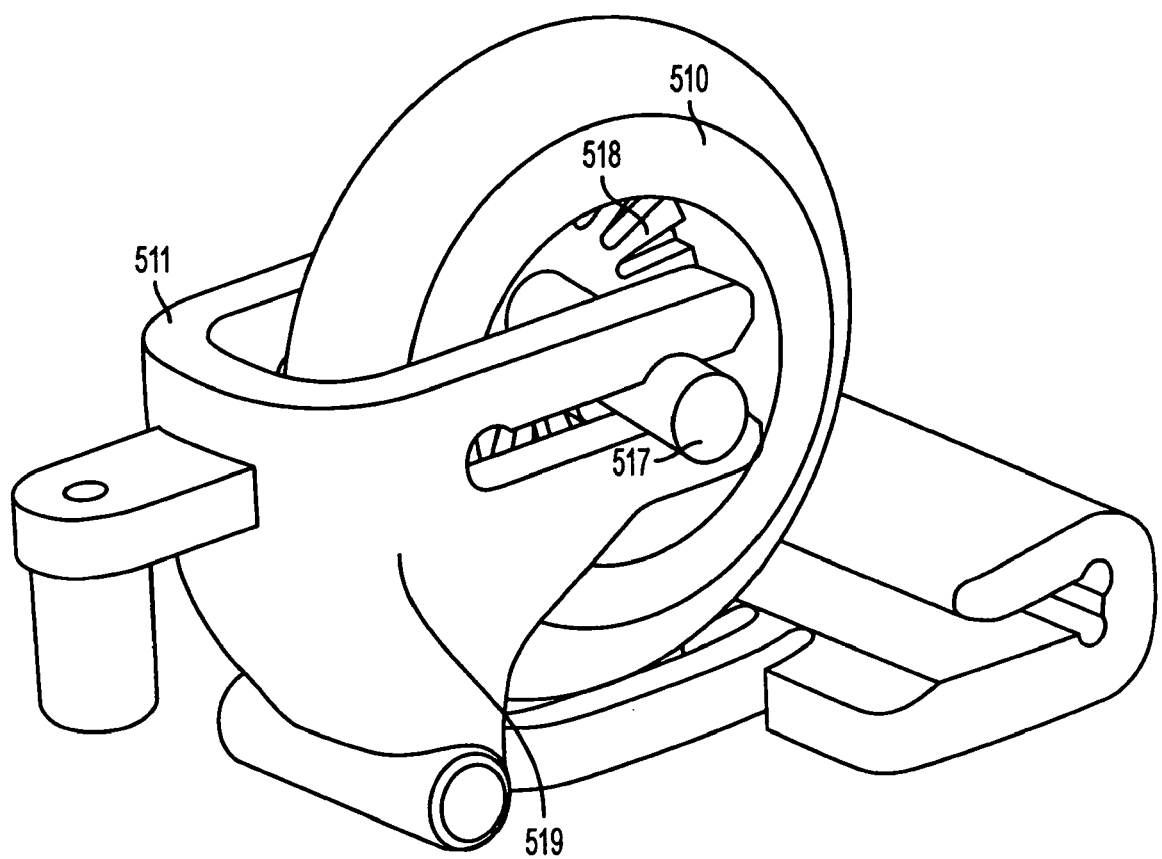
FIG. 32 is a perspective view of a scroll wheel and the scroll wheel carriage of FIG. 31.

FIG. 31 is a perspective view of a scroll wheel carriage 511 according to yet other embodiments of the invention. FIG. 32 is a perspective view, from a slightly different angle, of scroll wheel carriage 511 with a scroll wheel 510. Carriage 511 has a first section 519 attached by a flexure 533 to a second section 528. First section 519 includes upper arms 524U and 532U and lower arms 524L and 532L. Formed in arms 524U, 524L, 532U and 532L near ends 523 are axle guides 522 for holding axle 517 (FIG. 32) of wheel 510. At the bottom of first section 519 is a cylindrical member 584 having faces 585 and 586. First section 519 further includes an extension 553 having a downward projection 555. Second section 528 has upper and lower portions 582 and 581, respectively. Upper and lower portions 582 and 581 form a clip having an interior region 583.

Figure 33:
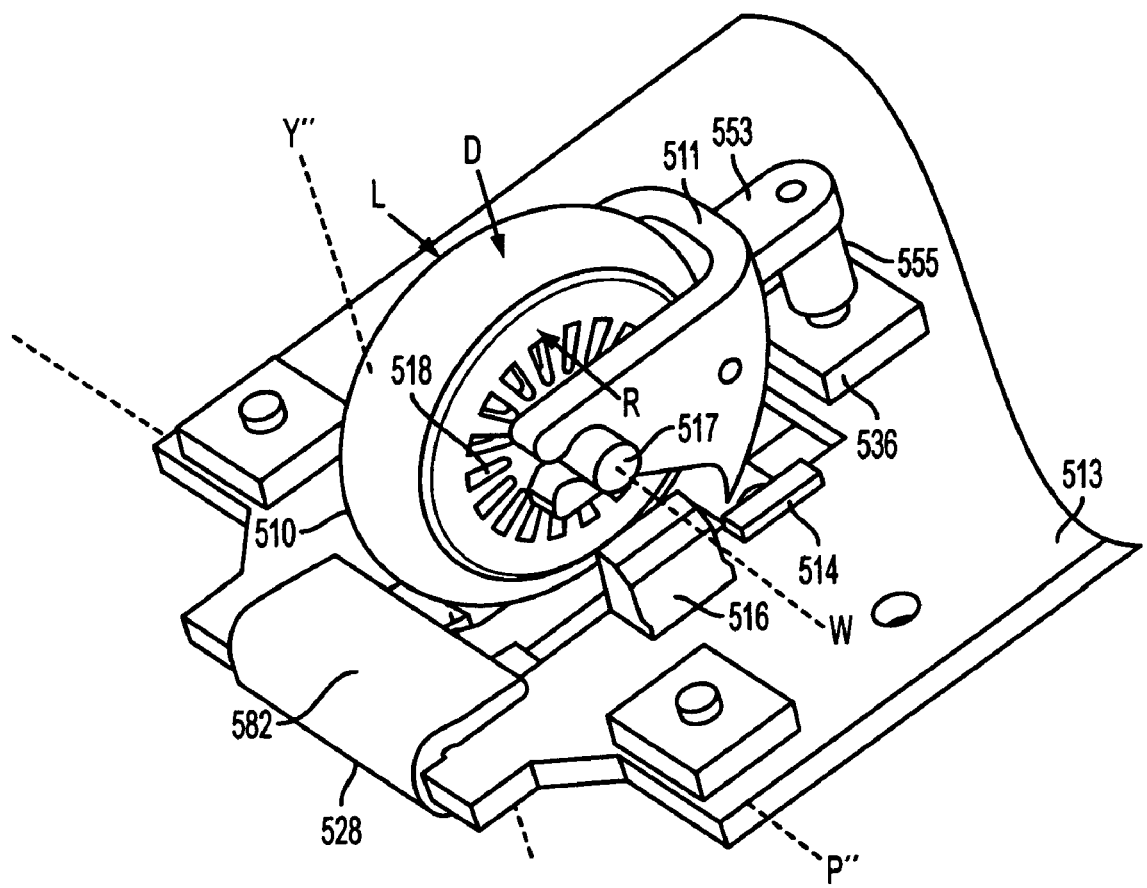
FIG. 33 is a perspective view of the scroll wheel and carriage of FIG. 33 installed on a printed circuit board.
Figure 34:
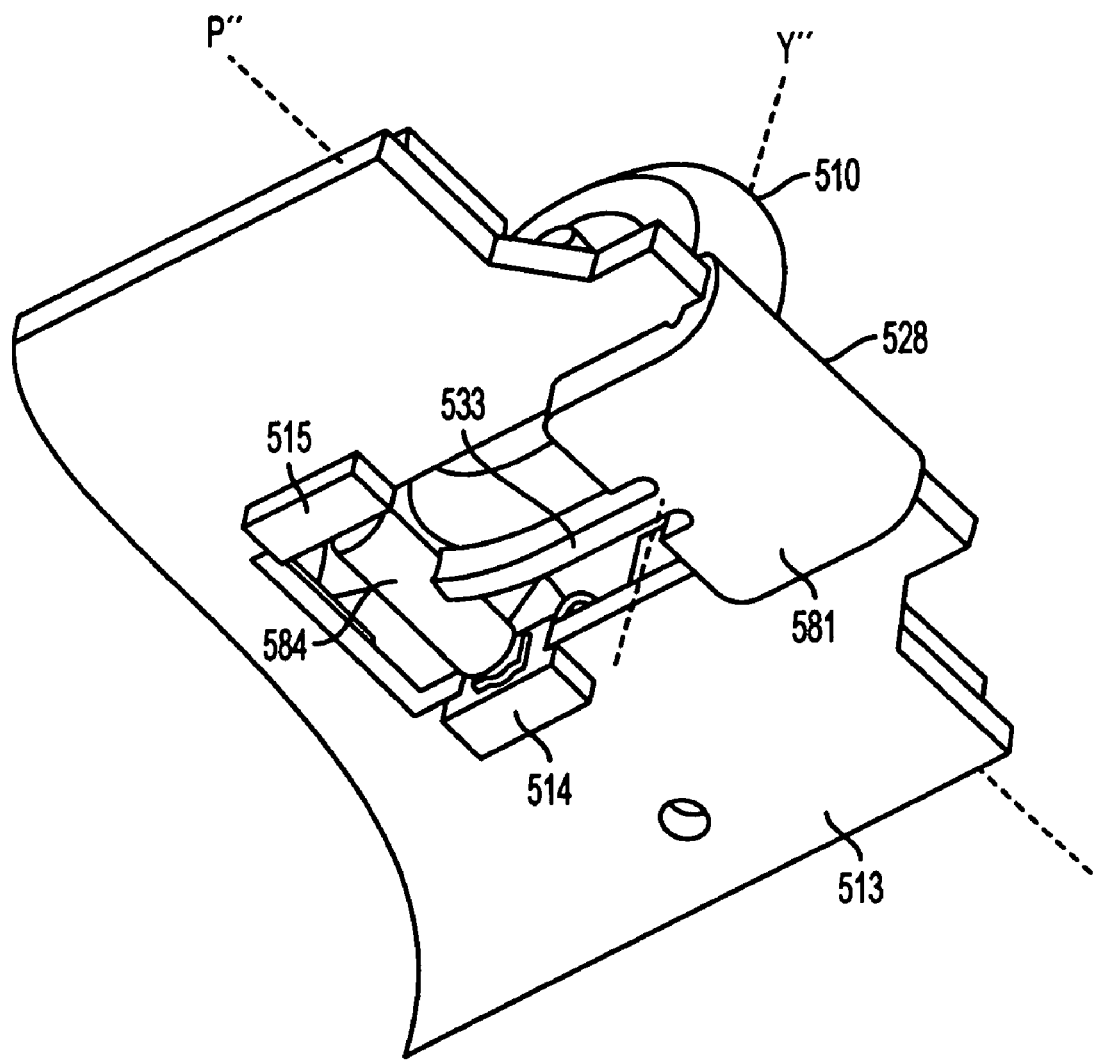
FIG. 34 a perspective view of the installed scroll wheel and carriage of FIG. 33 from the opposite side of the printed circuit board.

FIGS. 33 and 34 show carriage 511 and wheel 510 installed on a printed circuit board 513 of a mouse. To avoid obscuring FIGS. 33 and 34, the mouse housing and various other features are omitted. However, the orientation of printed circuit board 513 relative to the mouse housing is similar to that of other embodiments previously described. As seen in FIGS. 33 and 34, second section 528 attaches to printed circuit board 513 by action of the clip formed by upper and lower portions 582 and 581. In this manner, carriage 511 is coupled to the mouse housing via attachment to the printed circuit board, with the circuit board being coupled to the mouse housing. An optical sensor 516 encodes rotation of wheel 510 about its rotational axis W by detecting light shining through a fan 518. Pressing down on scroll wheel 510 in direction D causes first section 519 to move downward and generally about an axis P'''. As first section 519 moves downward a sufficient distance, the bottom of extension 555 actuates a center switch 536. Pushing on scroll wheel 510 in direction L causes first section 519 to move to the left and generally about an axis Y''. As section 519 moves sufficiently far to the left, face 586 (see FIG. 31) actuates a switch 14 (see FIG. 34). In response to actuation of switch 514, a signal is sent by mouse electronics (not shown) to a computer; that signal may be converted into a command resulting in horizontal scrolling to the left. Pushing on scroll wheel 510 in direction R causes first section 519 to move generally about axis Y'' to the right. As section 519 moves sufficiently far to the right, face 585 (see FIG. 31) actuates a switch 515 (see FIG. 34). In response to actuation of switch 515, a signal is sent by mouse electronics to a computer; that signal may be converted into a command resulting in horizontal scrolling to the right. Switches 514 and 515 are similar to switches 256 and 257. Center switch 536 is similar to switches 254 and 36. Flexure 533 biases first section 519 against movement, relative second section 528, about axes Y'' and P'''. As with previously-described embodiments, carriage 519 may be formed as a single piece of acetyl resin, nylon, polypropylene or other plastic having a high fatigue limit and high maximum strain limit, or may be formed from a combination of materials (either by multi-shot molding or by assembly of several pieces).

Although examples of carrying out the invention has been described, those skilled in the art will appreciate that there are numerous variations and permutations of the above described device that fall within the spirit and scope of the invention as set forth in the appended claims. As but a few examples, the dimensions, shapes and materials described herein can be varied in manners in addition to those described herein. The invention includes embodiments having a multi-piece flexure. For example, a flexure could include a first element that extends from one bracket and a second element extending from another bracket. The two elements could then be joined at their ends (e.g., with glue, with a threaded or other mechanical connection, etc.). The invention further includes carriages formed by insert molding, i.e., inserting a preformed component into a mold and molding additional elements onto the insert. Embodiments of the invention could also be implemented in connection with other mouse designs, with other pointing devices (e.g., trackballs), and with other input devices (e.g., keyboards). These and other modifications are within the scope of the invention.

The invention claimed is:

1. A scroll wheel assembly, comprising:
   a scroll wheel sized for movement by a finger of a human user and having a rotational axis; and
   a carriage having
      at least one fixture configured for coupling the carriage to a base so as to allow movement of at least a portion of the carriage relative to the base about a first carriage axis in response to force on the scroll wheel in a direction perpendicular to the rotational axis,
      a first section holding the scroll wheel and permitting the scroll wheel to rotate about the rotational axis,
      a second section, and
      a flexure joined to the first and second sections and permitting movement of the first section relative to the second section generally about a second carriage axis in response to forces on the scroll wheel in directions parallel to the rotational axis, and wherein the first section, the second section and the flexure form an integral unit.

2. The scroll wheel assembly of claim 1, wherein the second section includes an integral biasing member positioned to bias the carriage against movement about the first carriage axis when the carriage is coupled to the base.

3. The scroll wheel assembly of claim 2, wherein the flexure is of size and shape whereby an amount of force applied to the scroll wheel when the carriage is coupled to the base is sufficient to deflect the biasing member, but is insufficient to substantially move the first section, relative to the second section, about any axis generally parallel to the first carriage axis.

4. The scroll wheel assembly of claim 1, wherein
   the scroll wheel comprises a series a detents distributed around a circumferential surface of the scroll wheel, and
   the first section includes an integral follower having a portion in contact with the circumferential surface, the follower being biased to resist deflection as the scroll wheel rotates.

5. The scroll wheel assembly of claim 1, wherein
   the scroll wheel further comprises an integral axle, and
   the carriage further comprises at least one pair of tabs configured to receive and retain the axle.

6. The scroll wheel assembly of claim 1, wherein
   the carriage further includes an extension arm, the extension arm includes a paddle extending from said arm, the paddle is positioned to impart a force in a first direction when the carriage is coupled to the base and the first section moves relative to the second section in a first rotational direction about the second carriage axis, and the paddle is positioned to impart a force in a second direction when the carriage is coupled to the base and the first section moves relative to the second section in a second rotational direction about the second carriage axis.

7. The scroll wheel assembly of claim 1, wherein the flexure comprises a portion of the carriage having a cross-sectional area less than a cross-sectional area of the first section and less than a cross-sectional area of the second section.

8. The scroll wheel assembly of claim 7, wherein the flexure comprises plural support members.

9. The scroll wheel assembly of claim 1, wherein the flexure is comprised of a first material and at least one of the first and second sections is comprised of a second material, and wherein the first material is more flexible than the second material.

10. The scroll wheel assembly of claim 9, wherein the first material is a thermoplastic elastomer and the second material is acetyl resin.

11. The scroll wheel assembly of claim 1, wherein the scroll wheel includes an axle, the first section comprises a pair of arms rotatably retaining the axle, the at least one fixture is formed in the second section, and the second section includes an integral biasing member positioned to bias the carriage against movement about the first carriage axis when the carriage is coupled to the base.

12. The scroll wheel assembly of claim 1, wherein the flexure includes at least one protrusion retainably received within a socket, said socket being formed within one of the first and second sections.

13. The scroll wheel assembly of claim 1, wherein the at least one fixture includes a clip formed in the second section, and the flexure permits movement of the first section relative to the second section about the first and second carriage axes.

14. A computer input device, comprising:

a housing;

first, second and third switches;

a scroll wheel sized for movement by a finger of a human user; and a carriage coupled to the housing, wherein the scroll wheel is retained by the carriage and rotatable about a rotational axis, at least a portion of the carriage is movable with respect to the housing so as to permit movement of the scroll wheel in a first direction corresponding to engagement of the first switch and in a second direction corresponding to release of the first switch, the carriage includes first and second sections, the carriage further includes a flexure joining the first and second sections and permitting movement of the first section relative to the second section generally about a relative movement axis, movement of the first section in a first direction about the relative movement axis engages the second switch, and movement of the first section in a second direction about the relative movement axis engages the third switch.

15. The computer input device of claim 14, wherein the first section, the second section and the flexure form an integral unit.

16. The computer input device of claim 14, wherein the carriage is coupled to the housing so as to permit pivotal movement of the carriage relative to the housing.

17. The computer input device of claim 14, wherein the second section includes an integral biasing member positioned to bias the scroll wheel against movement in the first direction corresponding to engagement of the first switch.

18. The computer input device of claim 17, wherein the carriage is coupled to the housing so as to permit pivotal movement of the carriage, relative to the housing, about a pitch axis, the first direction corresponding to engagement of the first switch is a rotational direction about the pitch axis, and the flexure is of a size and shape whereby an amount of force applied to the scroll wheel is sufficient to deflect the biasing member, but is insufficient to substantially move the first section, relative to the second section, about any axis generally parallel to the pitch axis.

19. The computer input device of claim 14, wherein the scroll wheel comprises a series of detents distributed around a circumferential surface of the scroll wheel, and the first section includes an integral follower having a portion in contact with the circumferential surface, the follower being biased to resist deflection as the scroll wheel rotates.

20. The computer input device of claim 14, wherein the carriage further includes an extension arm positioned to engage the first switch.

21. The computer input device of claim 20, wherein the extension arm includes a paddle, and the paddle is positioned to alternately engage the second and third switches.

22. The computer input device of claim 14, wherein the flexure comprises a portion of the carriage having a cross-sectional area less than a cross-sectional area of the first section and less than a cross-sectional area of the second section.

23. The computer input device of claim 14, wherein the flexure is comprised of a first material and at least one of the first and second sections is comprised of a second material, and wherein the first material is more flexible than the second material.

24. The computer input device of claim 14, wherein the scroll wheel includes an axle, the first section comprises a pair of arms rotatably retaining the axle, the carriage is coupled to the housing so as to permit pivotal movement of the carriage, relative to the housing, about a pitch axis, and the second section includes an integral biasing member positioned to bias the carriage against pitch axis rotation.

25. The computer input device of claim 24, wherein the carriage includes a pin having a longitudinal axis generally coincident with the relative movement axis, the pin being constrained from lateral movement relative to the housing in one set of directions orthogonal to the relative movement axis but movable relative to the housing in another set of directions orthogonal to the relative movement axis.

26. The computer input device of claim 14, wherein the flexure includes at least one protrusion retainably received within a socket, said socket being formed within one of the first or second sections.

27. The computer input device of claim 14, wherein the carriage is coupled to the housing by attachment to a printed circuit board, said printed circuit board being coupled to the housing.

28. The computer input device of claim 27, wherein
the at least a portion of the carriage movable with respect to the housing includes the first section,
the second section is attached to the printed circuit board by a clip formed in the second section,
movement in the first direction includes movement of the first section relative to the second section about a second relative movement axis, and
the flexure permits movement of the first section relative to the second section about the first and second relative movement axes.

* * * * *

UNITED STATES PATENT AND TRADEMARK OFFICE
CERTIFICATE OF CORRECTION

PATENT NO.         : 7,443,382 B2                                         Page 1 of 1
APPLICATION NO.    : 10/927233
DATED              : October 28, 2008
INVENTOR(S)        : Koo et al.

It is certified that error appears in the above-identified patent and that said Letters Patent is hereby corrected as shown below:

In column 2, line 30, delete "it" and insert -- invention are set --, therefor.

In column 3, line 28, after "scroll" insert -- wheel --.

In column 10, line 49, in Claim 3, before "size" insert -- a --.

In column 10, line 56, in Claim 4, before "detents" delete "a" and insert -- of --, therefor.

Signed and Sealed this
Third Day of May, 2011

David J. Kappos
*Director of the United States Patent and Trademark Office*